US012421774B2

(12) United States Patent
Sakamoto

(10) Patent No.: US 12,421,774 B2
(45) Date of Patent: Sep. 23, 2025

(54) VEHICLE DOOR HANDLE DEVICE

(71) Applicant: AISIN CORPORATION, Kariya (JP)

(72) Inventor: Mizuya Sakamoto, Kariya (JP)

(73) Assignee: AISIN CORPORATION, Kariya (JP)

( * ) Notice: Subject to any disclaimer, the term of this patent is extended or adjusted under 35 U.S.C. 154(b) by 169 days.

(21) Appl. No.: 18/353,145

(22) Filed: Jul. 17, 2023

(65) Prior Publication Data

US 2024/0044188 A1 Feb. 8, 2024

(30) Foreign Application Priority Data

Aug. 3, 2022 (JP) ................................ 2022-124030

(51) Int. Cl.
*E05B 85/10* (2014.01)

(52) U.S. Cl.
CPC .......... *E05B 85/103* (2013.01); *E05B 85/107* (2013.01)

(58) Field of Classification Search
CPC ....... E05B 85/10; E05B 85/103; E05B 85/107
See application file for complete search history.

(56) References Cited

U.S. PATENT DOCUMENTS

2019/0283555 A1* 9/2019 Couto Maquieira . E05B 85/107
2021/0156178 A1* 5/2021 Heyduck ................ E05B 81/42

FOREIGN PATENT DOCUMENTS

DE 10 2017 101 418 A1 7/2018
DE 10 2017 010 196 B3 4/2019

(Continued)

OTHER PUBLICATIONS

Extended European Search Report issued Jan. 8, 2024 in European Patent Application No. 23186996.7, 7 pages.

*Primary Examiner* — Christine M Mills
*Assistant Examiner* — Christopher F Callahan
(74) *Attorney, Agent, or Firm* — Oblon, McClelland, Maier &Neustadt, L.L.P.

(57) ABSTRACT

A vehicle door handle device includes: a door handle supported by a housing to be movable between a storage position where the door handle is stored in the housing and a pop-up position where at least a part of the door handle jumps out of the housing; a first member configured to move in conjunction with the door handle such that the first member is located at a storage corresponding position when the door handle is located at the storage position and is located at a pop-up corresponding position when the door handle is located at the pop-up position; a second member supported movably with respect to the first member; a second member biasing member configured to bias the second member to be elastically movable with respect to the first member; and a third member movable between an out-of-trajectory position and an in-trajectory position, the out-of-trajectory position being a position outside a movement trajectory of the second member when the first member moves from the pop-up corresponding position to the storage corresponding position, the in-trajectory position being a position where at least a part of the third member enters the movement trajectory. When the first member is located at the pop-up corresponding position and the third member is located at the in-trajectory position, the first member is restricted from moving from the pop-up corresponding position to the storage corresponding position by the second member coming into contact with the third member.

5 Claims, 11 Drawing Sheets

(56) References Cited

FOREIGN PATENT DOCUMENTS

| | | | | | |
|---|---|---|---|---|---|
| DE | 10 2018 214 372 | B3 | | 1/2020 | |
| EP | 3540157 | A1 | * | 9/2019 | ............ B60J 5/0416 |
| GB | 2506350 | A | * | 4/2014 | ............ E05B 5/003 |
| JP | 2008-248631 | A | | 10/2008 | |
| WO | WO-2017153088 | A1 | * | 9/2017 | ............ E05B 81/06 |

* cited by examiner

VEHICLE DOOR HANDLE DEVICE

CROSS REFERENCE TO RELATED APPLICATIONS

This application is based on and claims priority under 35 U.S.C. § 119 to Japanese Patent Application 2022-124030, filed on Aug. 3, 2022, the entire content of which is incorporated herein by reference.

TECHNICAL FIELD

This disclosure relates to a vehicle door handle device.

BACKGROUND DISCUSSION

A vehicle door handle device having a pop-up function is configured such that a door handle is stored in a vehicle door when not in use, and the door handle jumps out (pops up) from the vehicle door toward an outside of a vehicle when in use. For example, a door handle device disclosed in JP 2008-248631A (Reference 1) includes a door handle that is rotatably supported by a vehicle door, and is movable between a position where the door handle is stored in the vehicle door (also referred to as a storage position) and a position where the door handle jumps out from the vehicle door (also referred to as a pop-up position) by the door handle rotating with respect to the vehicle door.

The door handle device having the pop-up function holds the door handle which is located at the pop-up position at the pop-up position by a predetermined holding force. Further, such a door handle device is configured such that, when the door handle is located at the pop-up position and the door handle is pushed toward an inside of the vehicle door by a force exceeding the holding force, the door handle moves from the pop-up position to the storage position. In such a configuration, when the force for holding the door handle at the pop-up position is not stable, a feeling of use of the door handle is reduced.

A need thus exists for a door handle device which is not susceptible to the drawback mentioned above.

SUMMARY

According to an aspect of this disclosure, a vehicle door handle device includes:

- a door handle supported by a housing to be movable between a storage position where the door handle is stored in the housing and a pop-up position where at least a part of the door handle jumps out of the housing;
- a first member configured to move in conjunction with the door handle such that the first member is located at a storage corresponding position when the door handle is located at the storage position and is located at a pop-up corresponding position when the door handle is located at the pop-up position;
- a second member supported movably with respect to the first member;
- a second member biasing member configured to bias the second member to be elastically movable with respect to the first member; and
- a third member movable between an out-of-trajectory position and an in-trajectory position, the out-of-trajectory position being a position outside a movement trajectory of the second member when the first member moves from the pop-up corresponding position to the storage corresponding position, the in-trajectory position being a position where at least a part of the third member enters the movement trajectory, in which when the first member is located at the pop-up corresponding position and the third member is located at the in-trajectory position, the first member is restricted from moving from the pop-up corresponding position to the storage corresponding position by the second member coming into contact with the third member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1A:
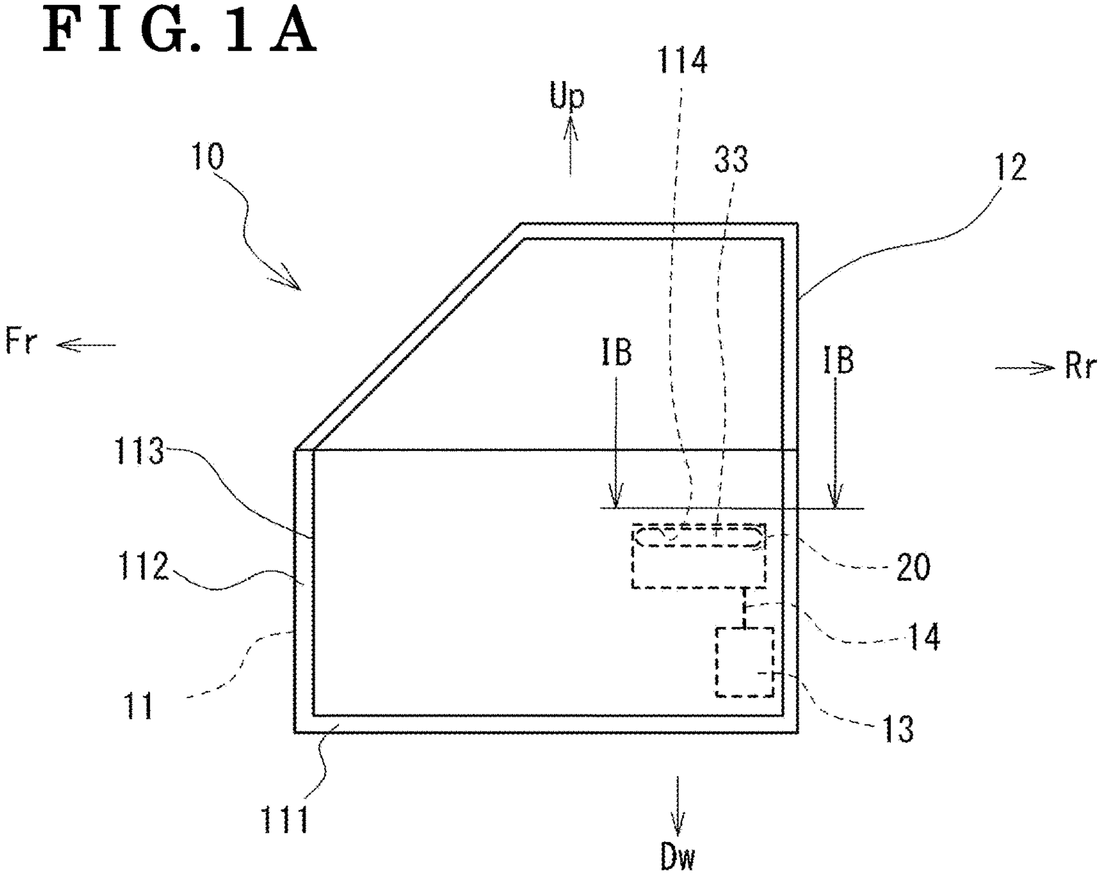
FIG. 1A is a schematic view illustrating a configuration of a vehicle door.

A vehicle door handle device according to an embodiment disclosed here is a device that is attached to a vehicle door and is used by a user of a vehicle to open a vehicle door in a closed state from an outside of the vehicle. In the drawings, a front side of the vehicle door handle device is indicated by an arrow Fr, a rear side thereof is indicated by an arrow Rr, an upper side thereof is indicated by an arrow Up, a lower side thereof is indicated by an arrow Dw, a vehicle outer side (a vehicle width direction outer side) thereof is indicated by an arrow Out, and a vehicle inner side (a vehicle width direction inner side) thereof is indicated by an arrow In.

Directions indicate directions when the vehicle door handle device is assembled to the vehicle door and the vehicle door is in the closed state. In the following description, the "vehicle door handle device" may be abbreviated as a "door handle device".

Vehicle Door

Figure 1B:
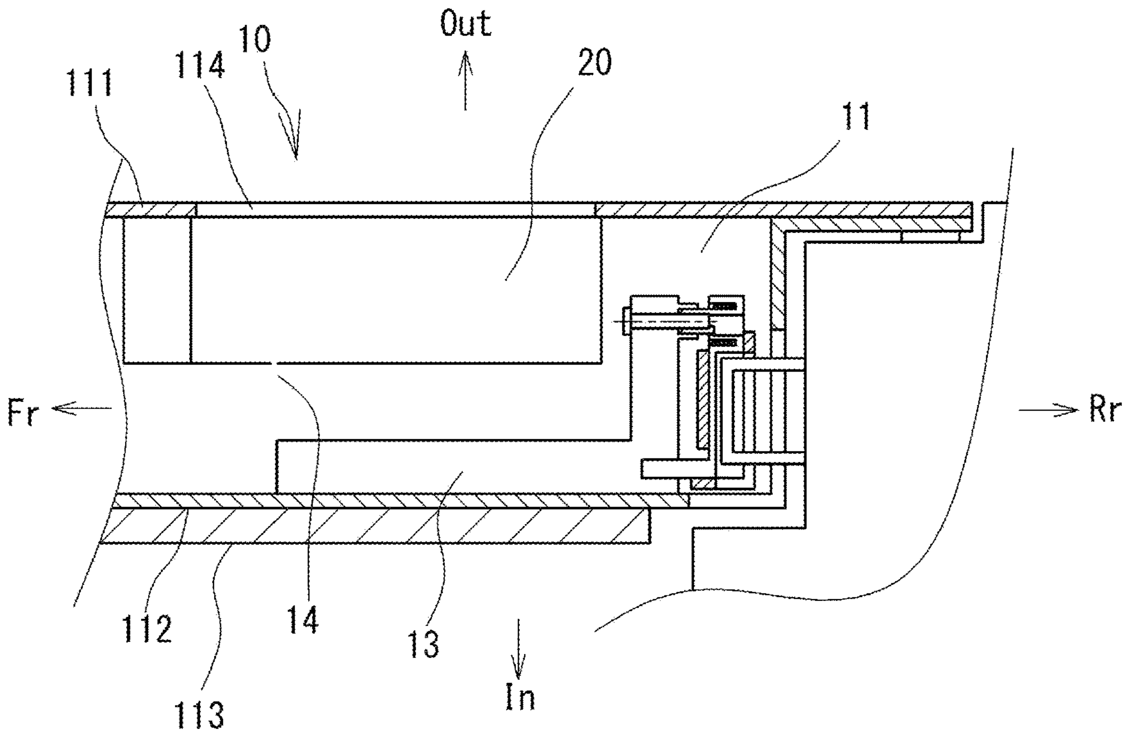
FIG. 1B is a schematic view illustrating a configuration of the vehicle door.

FIGS. 1A and 1B are schematic views illustrating a configuration of a vehicle door 10 to which a door handle device 20 is assembled. FIG. 1A is a view seen from the vehicle inner side, and FIG. 1B is a cross-sectional view taken along a line IB-IB in FIG. 1A. The vehicle door 10 illustrated in FIG. 1A is a vehicle right front door (FL door), and a front end thereof is rotatably supported by a vehicle body (not illustrated) about a rotation axis substantially parallel to an upper-lower direction. The vehicle door 10 is movable between a closed position where the vehicle door 10 closes an opening for getting in and out provided in the vehicle body and an open position where the vehicle door 10 does not close the opening by rotating with respect to the vehicle body.

The vehicle door 10 includes a door body portion 11 constituting a lower half portion thereof and a door sash portion 12 constituting an upper half portion thereof. As illustrated in FIG. 1B, the door body portion 11 includes an outer panel 111 constituting an outer side surface thereof, an inner panel 112 located on a vehicle inner side of the outer panel 111, and a resin trim 113 fixed to a surface of the inner panel 112 on the vehicle inner side and constituting an inner side surface of the door body portion 11. The outer panel 111 and the inner panel 112 define an internal space of the door body portion 11. The door handle device 20 and a door lock device 13 are disposed in the internal space of the door body portion 11. The outer panel 111 is provided with an opening 114 penetrating the outer panel 111 in a vehicle width direction, and a door handle 33 of the door handle device 20 to be described later is exposed to the vehicle outer side through the opening 114 and can jump out to the vehicle outer side through the opening 114.

The door lock device 13 includes a latch mechanism and a lock mechanism. The latch mechanism is switchable between an unlatched state where the vehicle door 10 is allowed to move from the closed position to the open position and a latched state where the vehicle door 10 is not allowed to move from the closed position to the open position. The lock mechanism is switchable between an unlocked state where the latch mechanism is allowed to be switched from the latched state to the unlatched state and a locked state where the latch mechanism is not allowed to be switched from the latched state to the unlatched state.

The door handle device 20 and the door lock device 13 are connected by a predetermined connecting member 14 (for example, a rod). The door handle device 20 can move the connecting member 14. The latch mechanism of the door lock device 13 switches from the latched state to the unlatched state when the connecting member 14 is moved by the door handle device 20 in the latched state. The door lock device 13 further includes an actuator (not illustrated), and switches the latch mechanism from the latched state to the unlatched state by a driving force of the actuator. The vehicle further includes an ECU (not illustrated) that controls the door handle device 20 and the door lock device 13, and the ECU drives the actuator of the door lock device 13 and an actuator 41 of an actuator assembly 40 of the door handle device 20 to be described later.

Door Handle Device

Figure 2:
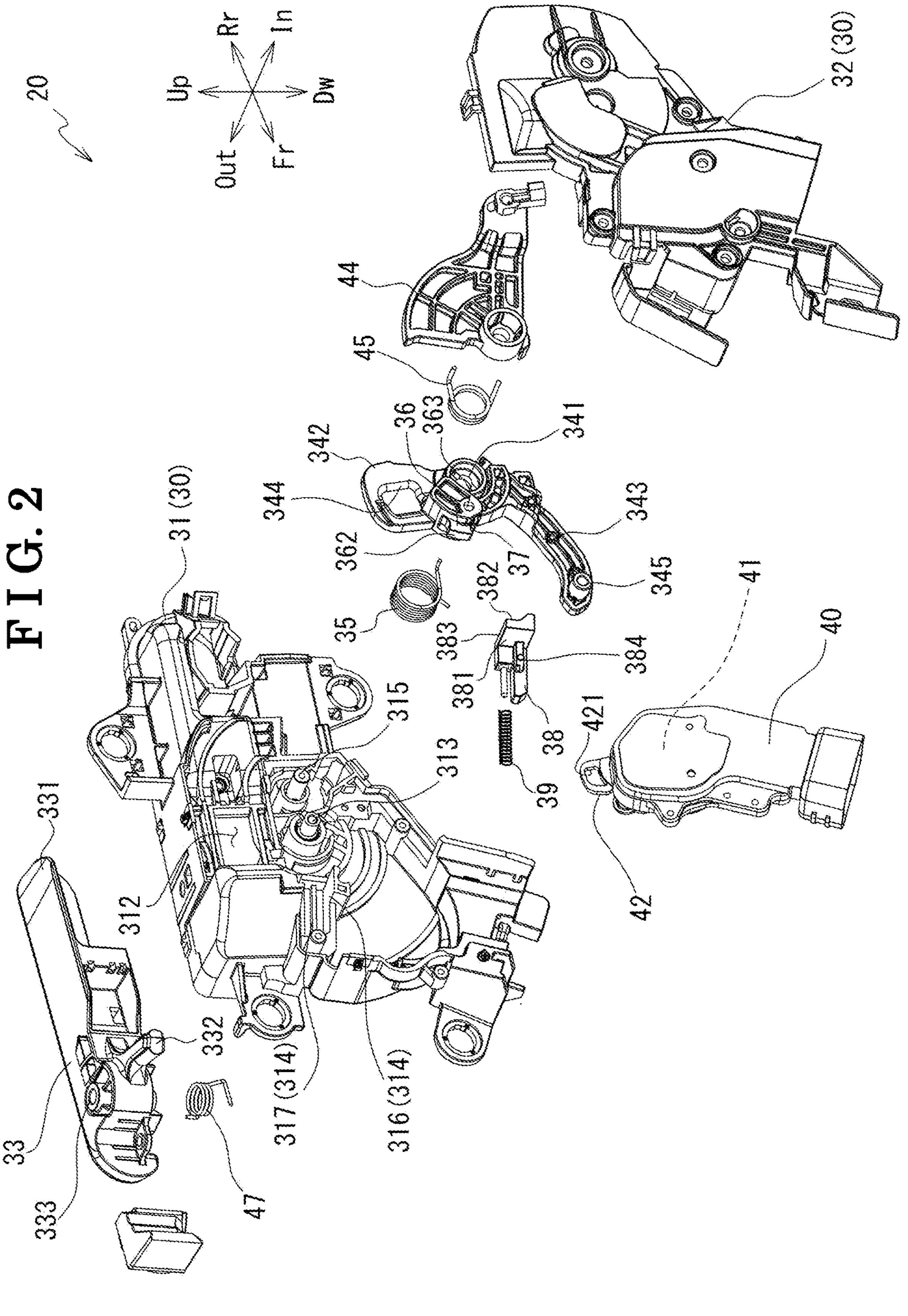
FIG. 2 is an exploded perspective view illustrating a configuration of a door handle device.
Figure 3:
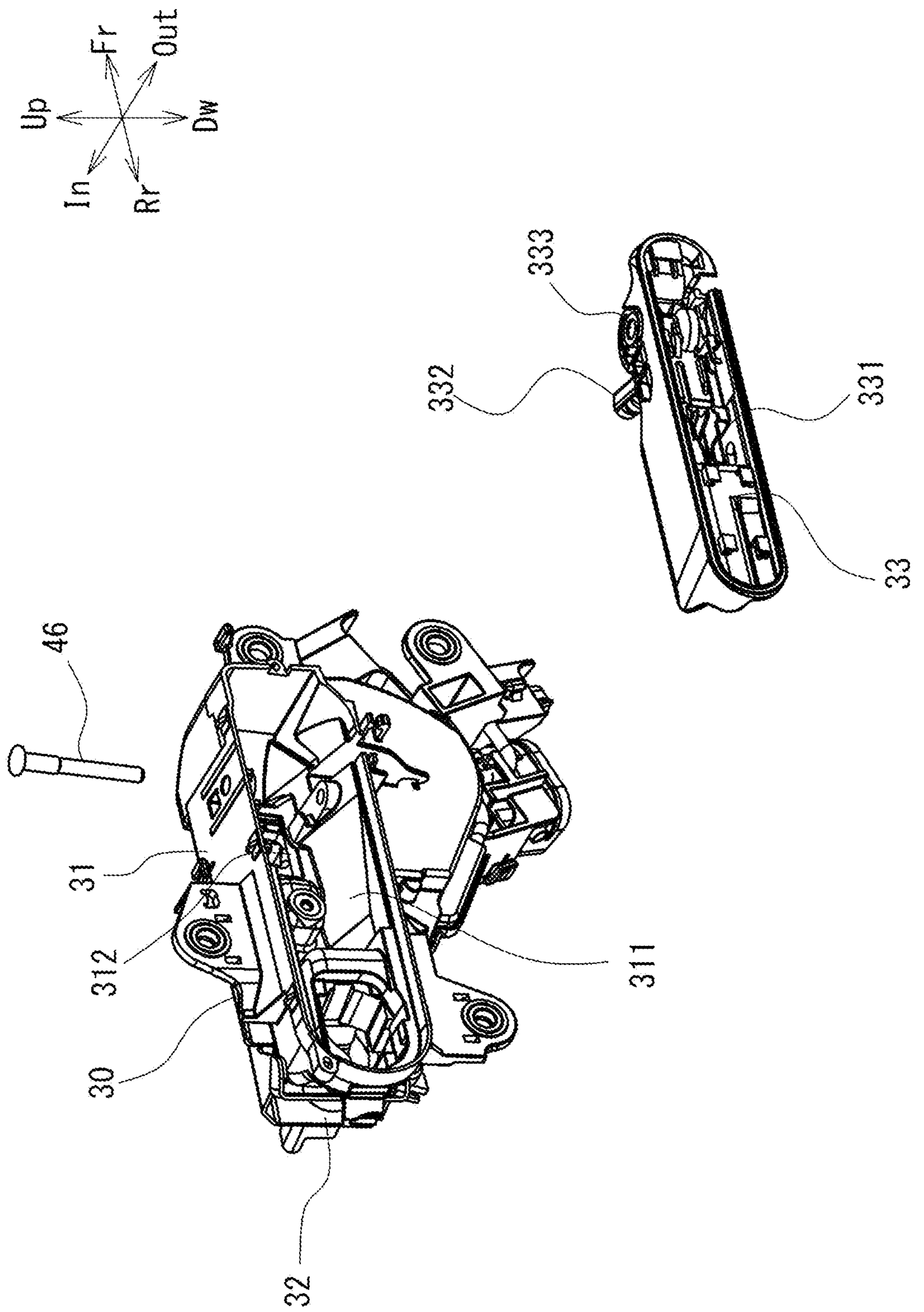
FIG. 3 is an exploded perspective view illustrating a configuration of the door handle device.

FIGS. 2 and 3 are exploded perspective views illustrating a configuration of the door handle device 20. FIG. 2 is a view seen from the vehicle inner side, and FIG. 3 is a view seen from the vehicle outer side. The door handle device 20 includes a housing 30, the door handle 33, a first lever 34, a first lever biasing spring 35, a sub-lever 36, a sub-lever biasing spring 37, a stopper 38, a stopper biasing spring 39, the actuator assembly 40, a bell crank 44, a bell crank biasing spring 45, and a door handle biasing spring 47.

The housing 30 includes a base 31 and a cover 32 attached to a vehicle inner side of the base 31. A door handle storage portion 311 capable of storing the door handle 33 is provided on a vehicle outer side of an upper portion of the base 31. The door handle storage portion 311 is a recessed portion that is elongated in a front-rear direction and is open to the vehicle outer side. The base 31 is provided with an arm portion insertion hole 312. The arm portion insertion hole 312 is an opening penetrating the base 31 in the vehicle width direction, and allows an arm portion 332 (to be described later) of the door handle 33 stored in the door handle storage portion 311 to be inserted from the vehicle outer side to the vehicle inner side.

A first lever support portion 313, a stopper support portion 314, and a bell crank support portion 315 are provided on a surface of the base 31 on the vehicle inner side and on a lower side of the door handle storage portion 311. The first lever support portion 313 is a portion that rotatably supports the first lever 34 about a straight line substantially parallel to the vehicle width direction. The stopper support portion 314 is a portion that supports the stopper 38 such that the stopper 38 can reciprocate substantially in the front-rear direction. The bell crank support portion 315 is a portion that rotatably supports the bell crank 44 about the straight line substantially parallel to the vehicle width direction. The first lever support portion 313 and the bell crank support portion 315 each have a cylindrical (or columnar) configuration protruding to the vehicle inner side. The stopper support portion 314 includes a stopper support surface 316 and a stopper guide 317. The stopper support surface 316 is a flat surface extending substantially in the front-rear direction and facing substantially upward. The stopper guide 317 is located above the stopper support surface 316, and is a rib-shaped portion that protrudes in the vehicle width direction and extends in a direction parallel to the stopper support surface 316. The first lever support portion 313 is located below the arm portion insertion hole 312, the stopper support portion 314 is located in front of the first lever support portion 313, and the bell crank support portion 315 is located behind the first lever support portion 313.

The door handle 33 includes a grip portion 331 and the arm portion 332. The grip portion 331 is a portion to be touched and gripped by the user of the vehicle (or may be hooked by a hand, a finger, or the like), and has an elongated rod shape. The door handle 33 is disposed such that a longitudinal direction of the grip portion 331 is substantially parallel to the front-rear direction. A door handle support shaft insertion hole 333 through which a door handle support shaft 46 can be inserted is provided in the vicinity of a front end of the grip portion 331. The door handle support shaft insertion hole 333 is a through hole having a substantially circular cross-section and penetrating the grip portion 331 in the substantially upper-lower direction.

The arm portion 332 of the door handle 33 is provided in front of the grip portion 331 and in the vicinity of the door handle support shaft insertion hole 333, and has a rod-shaped configuration protruding from the grip portion 331 to the vehicle inner side. In the present embodiment, an example is disclosed in which the arm portion 332 is provided immediately behind the door handle support shaft insertion hole 333 and has a rod-shaped configuration protruding toward an oblique front side of the vehicle inner side.

The door handle 33 is rotatably supported by the base 31 (housing 30) via the door handle support shaft 46 about the straight line substantially parallel to the upper-lower direction. It can also be said that the door handle 33 is rotatably connected to the base 31. The door handle support shaft 46 is a columnar member for rotatably supporting the door handle 33 on the base 31. A portion of the grip portion 331 on a rear side of the door handle support shaft insertion hole 333 (the door handle support shaft 46) can reciprocate substantially in the vehicle width direction by rotating the door handle 33 about the door handle support shaft insertion hole 333 with respect to the base 31 (in other words, by swinging in a pendulum shape).

The door handle 33 is movable to a storage position (see FIG. 4A), a pop-up position (see FIG. 8A), and a manually unlatched position (see FIG. 9A) by rotating with respect to the base 31.

The storage position of the door handle 33 is a position where the longitudinal direction of the grip portion 331 of the door handle 33 is substantially parallel to the front-rear direction and substantially the entire door handle 33 is stored inside the door handle storage portion 311 of the base 31. The pop-up position and the manually unlatched position of the door handle 33 are positions where the portion of the grip portion 331 on the rear side of the door handle support shaft 46 jumps out to the vehicle outer side from surfaces of the door handle storage portion 311 of the base 31 and the outer panel 111 of the vehicle door 10 on the vehicle outer side in a state where the longitudinal direction of the grip portion 331 is inclined at a predetermined angle with respect to the front-rear direction. That is, the pop-up position and the manually unlatched position are positions where at least a part of the door handle jumps out of the base 31. A jump-out amount of the grip portion 331 to the vehicle outer side is larger at the manually unlatched position than at the pop-up position. Therefore, it can also be said that the storage position of the door handle 33 is a position when the grip portion 331 is located at an innermost position in a movable range of the door handle 33, the manually unlatched position is a position when the grip portion 331 is located at an outermost position in the movable range of the door handle 33, and the pop-up position is an intermediate position between the storage position and the manually unlatched position.

When the door handle 33 is located at the storage position, a surface of the grip portion 331 of the door handle 33 on the vehicle outer side is substantially flush with a surface of the outer panel 111 of the vehicle door 10 on the vehicle outer side. The door handle 33 is exposed to the vehicle outer side through the opening 114 provided in the outer panel 111 of the vehicle door 10, and the user can come into contact with the surface on the vehicle outer side of the door handle 33 located at the storage position (see FIGS. 1A and 1B). However, when the door handle 33 is located at the storage position, the user cannot grip the grip portion 331 or place a hand, a finger, or the like thereon. On the other hand, when the door handle 33 is located at the pop-up position or the manually unlatched position, the user can grip the grip portion 331 or place a hand, a finger, or the like thereon. Therefore, when the door handle 33 is located at the pop-up position, the user can move the door handle 33 to the manually unlatched position by further pulling out the grip portion 331 to the vehicle outer side.

The arm portion 332 of the door handle 33 moves substantially in the front-rear direction when the door handle 33 rotates about the door handle support shaft 46 (swings in the pendulum shape). When the door handle 33 is located at the storage position, the arm portion 332 is located at a front end of a movable range. When the door handle 33 is located at the manually unlatched position, the arm portion 332 is located at a rear end of the movable range. When the door handle 33 is located at the pop-up position, the arm portion 332 is located in a middle of the movable range.

The door handle biasing spring 47 constantly elastically biases the door handle 33 to the storage position. For example, a torsion spring including arms at both ends is applied to the door handle biasing spring 47, and one arm is engaged with the base 31 and the other arm is engaged with the door handle 33, thereby biasing the door handle 33 in a predetermined direction. It can also be said that the door handle biasing spring 47 biases the grip portion 331 to the vehicle inner side and biases the arm portion 332 to the front side.

Figure 4A:
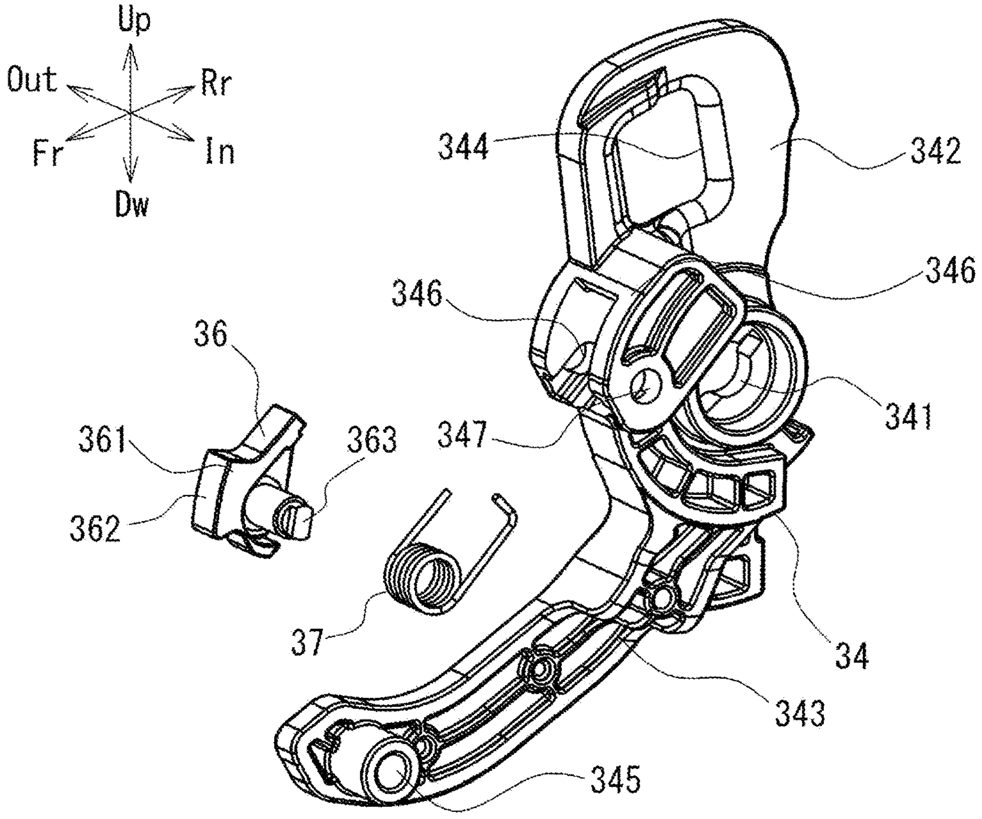
FIG. 4A is a view illustrating configurations of a first lever, a sub-lever, and a sub-lever biasing spring.
Figure 4B:
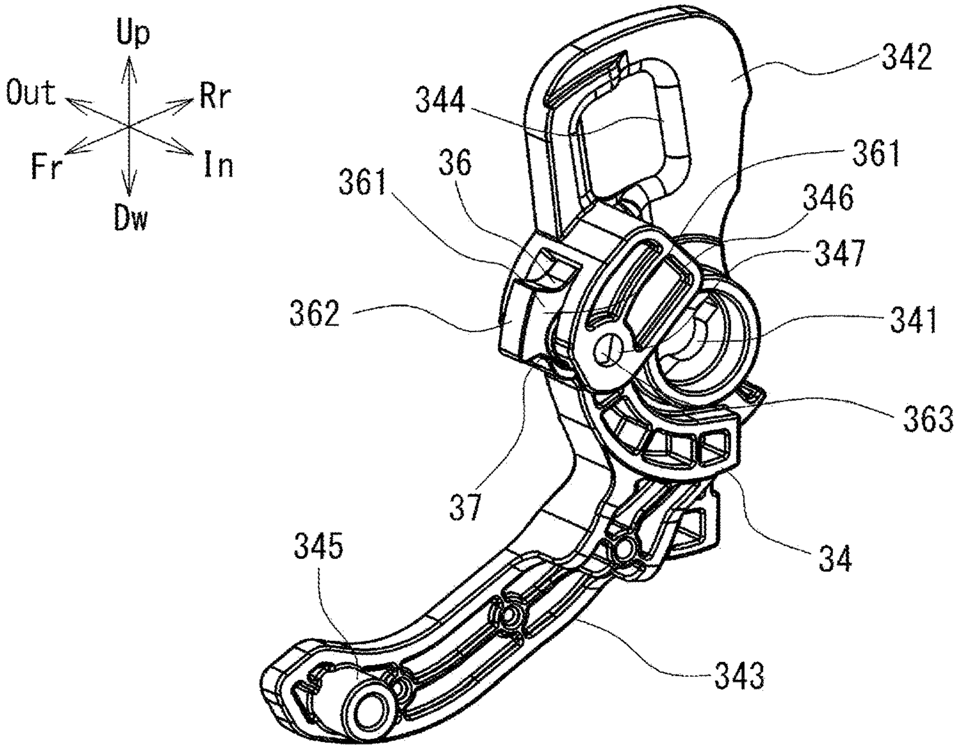
FIG. 4B is a view illustrating a configuration of the first lever, the sub-lever, and the sub-lever biasing spring.

FIGS. 4A and 4B are views illustrating configurations of the first lever 34, the sub-lever 36, and the sub-lever biasing spring 37. FIG. 4A is an exploded perspective view, and FIG. 4B is a perspective view illustrating a state where these members are assembled.

The first lever 34 is an example of a first member disclosed here. The first lever 34 is disposed on the vehicle inner side of the grip portion 331 of the door handle 33 when viewed in the upper-lower direction. The first lever 34 is provided with a shaft hole 341 having a substantially circular cross-section and penetrating the first lever 34 in the vehicle width direction. The first lever support portion 313 provided in the base 31 is inserted into the shaft hole 341 from the vehicle outer side to the vehicle inner side, and the first lever 34 is rotatably supported by the base 31 about the straight line substantially parallel to the vehicle width direction.

The first lever 34 includes a portion (hereinafter, may be referred to as an upper arm portion 342) extending upward from a rotation center (a portion where the shaft hole 341 is provided) of the first lever 34, a portion (hereinafter, may be referred to as a lower arm portion 343) extending forward and obliquely downward from the rotation center, and a sub-lever support portion 346 that supports the sub-lever 36. An arm portion engagement hole 344 penetrating the upper arm portion 342 in the vehicle width direction is provided in an upper end of the upper arm portion 342 of the first lever 34. The arm portion 332 of the door handle 33 is inserted into the arm portion engagement hole 344 from the vehicle outer side to the vehicle inner side. A second lever engagement projection 345 engageable with and detachable from a second lever 42 to be described later is provided in the vicinity of a lower end of the lower arm portion 343 of the first lever 34. The second lever engagement projection 345 has a round-rod-shaped configuration protruding to the vehicle inner side.

Since the arm portion 332 of the door handle 33 is inserted into the arm portion engagement hole 344 of the first lever 34, the first lever 34 and the door handle 33 move in conjunction with each other. The first lever 34 is movable to a storage corresponding position (see FIG. 4B), a pop-up corresponding position (see FIG. 8B), and a manually unlatched corresponding position (see FIG. 9B) in conjunction with the door handle 33. The storage corresponding position is a position when the door handle 33 is located at the storage position, and is a position when the upper arm portion 342 is located at a front end of a movable range. The manually unlatched corresponding position is a position when the door handle 33 is located at the manually unlatched position, and is a position when the upper arm portion 342 is located at a rear end of the movable range. The pop-up corresponding position is a position when the door handle 33 is located at the pop-up position, and is a position when the upper arm portion 342 is located in a middle of the movable range.

The first lever biasing spring 35 constantly elastically biases the first lever 34 to the manually unlatched corresponding position. It can also be said that the first lever biasing spring 35 biases the upper arm portion 342 of the first lever 34 toward a rear side and biases the lower arm portion 343 of the first lever 34 toward a front side. For example, a torsion spring including arms at both ends is applied to the first lever biasing spring 35. In this case, the first lever support portion 313 is inserted into a coil-shaped portion of the torsion spring, one arm is engaged with the first lever 34, and the other arm is engaged with the base 31.

Since the first lever 34 and the door handle 33 move in conjunction with each other, a biasing force of the door handle biasing spring 47 is applied to the first lever 34 via the arm portion 332 of the door handle 33. The biasing force acts in a direction in which the first lever 34 is biased to the storage corresponding position. The biasing force of the door handle biasing spring 47 transmitted to the first lever 34 via the door handle 33 (that is, the force biasing the first lever 34 to the storage corresponding position) is larger than a biasing force of the first lever biasing spring 35 (that is, a force biasing the first lever 34 to the manually unlatched corresponding position). Therefore, the door handle 33 is constantly elastically biased to the storage position and the first lever 34 is constantly elastically biased to the storage corresponding position by a "force obtained by subtracting the biasing force of the first lever biasing spring 35 from the biasing force of the door handle biasing spring 47".

The sub-lever support portion 346 is provided on a front side of the shaft hole 341. The sub-lever support portion 346 is provided with an internal space in which the sub-lever 36 can be stored and a front side is open. Further, the sub-lever support portion 346 is provided with a sub-lever support hole 347 into which a shaft 363 of the sub-lever 36 can be inserted. The sub-lever support hole 347 is a round hole extending in a direction substantially parallel to the vehicle width direction (that is, substantially parallel to the shaft hole 341).

The sub-lever 36 is an example of a second member disclosed here. The sub-lever 36 includes a stopper engagement portion 361 provided at a front portion and the shaft 363 provided at a rear portion. The sub-lever 36 is supported movably (rotatably) by the first lever 34 in the sub-lever support portion 346 of the first lever 34 (in other words, at a position on a front side relative to the rotation center of the first lever 34 with respect to the base 31, and further in other words, at a position close to the stopper 38 as viewed from the rotation center of the first lever 34). Specifically, a rear portion (a portion where the shaft 363 is provided) of the sub-lever 36 is stored in the internal space provided in the sub-lever support portion 346 of the first lever 34, and the shaft 363 of the sub-lever 36 is inserted into the sub-lever support hole 347 of the sub-lever support portion 346 of the first lever 34. A rotation center line of the sub-lever 36 with respect to the first lever 34 and a rotation center line of the first lever 34 with respect to the base 31 are substantially parallel to each other. The "position where the sub-lever support portion 346 is provided and that is close to the stopper 38 as viewed from the rotation center of the first lever 34" is an example of a predetermined position disclosed here.

As illustrated in FIG. 4B, the stopper engagement portion 361 of the sub-lever 36 is a portion protruding forward from a front surface of the first lever 34 in a state where the sub-lever 36 is supported by the sub-lever support portion 346 of the first lever 34. Further, it can also be said that the stopper engagement portion 361 of the sub-lever 36 is a portion protruding forward from a front surface of the sub-lever support portion 346. A front surface 362 (a surface close to the stopper 38 in the front-rear direction) of the stopper engagement portion 361 is an arc-shaped curved surface around the rotation center line of the first lever 34 with respect to the base 31. A lower end of the stopper engagement portion 361 has a tapered shape (a shape in which a dimension in the front-rear direction decreases to the lower side). When the sub-lever 36 rotates with respect to the base 31 together with the first lever 34, the stopper engagement portion 361 of the sub-lever 36 moves substantially in the upper-lower direction (more specifically, a direction intersecting a movement direction of the stopper 38). Further, when the sub-lever 36 rotates with respect to the first lever 34, the stopper engagement portion 361 of the sub-lever 36 moves substantially in the upper-lower direction (more specifically, the direction intersecting the movement direction of the stopper 38) with respect to the first lever 34.

The sub-lever 36 is movable between a first position and a second position by moving with respect to the first lever 34. The first position is a position of a lower end of a movement range of the sub-lever 36 with respect to the first lever 34 (more specifically, a position on an end of a front side in a movement direction when the first lever 34 moves from the manually unlatched corresponding position to the storage corresponding position). For example, when a lower surface of the sub-lever 36 comes into contact with an inner surface (bottom surface) of the sub-lever support portion 346 of the first lever 34, the sub-lever 36 cannot move further to the lower side than the position with respect to the first lever 34. The position at this time is the first position of the sub-lever 36. The second position is a position above the lower end of the movement range of the sub-lever 36 with respect to the first lever 34 (more specifically, a position on a rear side in the movement direction when the first lever 34 moves from the manually unlatched corresponding position to the storage corresponding position). The second position may not be a position of an end of the movement range of the sub-lever 36 with respect to the first lever 34. In other words, it is sufficient that the sub-lever 36 is movable further upward than the second position with respect to the first lever 34.

The sub-lever biasing spring 37 is a member that biases the sub-lever 36 to be elastically movable with respect to the first lever 34. Specifically, the sub-lever biasing spring 37 constantly elastically biases the sub-lever 36 to the first position with respect to the first lever 34. As described above, since the sub-lever 36 cannot move to the lower side than the first position with respect to the first lever 34, when a force other than a biasing force of the sub-lever biasing spring 37 is not applied to the sub-lever 36, the sub-lever 36 is held at the first position. A torsion spring including arms at both ends is applied to the sub-lever biasing spring 37. In this case, a coil-shaped portion of the torsion spring surrounds the shaft 363 of the sub-lever 36, one arm of the torsion spring is engaged with the sub-lever 36, and the other arm is engaged with the first lever 34.

The stopper 38 is disposed substantially in front of the sub-lever 36. The stopper 38 is supported by the stopper support portion 314 provided on the base 31. Specifically, a lower surface of the stopper 38 comes into contact with an upper surface of the stopper support surface 316 of the stopper support portion 314. Further, a groove extending substantially in the front-rear direction is provided in a surface of the stopper 38 on a vehicle inner side, and the stopper guide 317 of the stopper support portion 314 is fitted into the groove. Therefore, the stopper 38 can linearly reciprocate in a direction approaching and away from the rotation center of the first lever 34 along the stopper support surface 316 and the stopper guide 317 of the stopper support portion 314. Hereinafter, an end close to the rotation center of the first lever 34 in a movement range of the stopper 38 may be referred to as a proximal end, and an end far from the rotation center of the first lever 34 may be referred to as a distal end. In the present embodiment, since the stopper 38 can linearly reciprocate substantially in the front-rear direction, a rear end of a movable range is the proximal end, and a front end of a movable range is the distal end.

An end (hereinafter, may be simply referred to as an "end 381 of the stopper 38") of the stopper 38 close to the rotation center of the first lever 34 is provided with a surface that faces the rotation center of the first lever 34 and is substantially perpendicular to the movement direction of the stopper 38. Hereinafter, the surface may be referred to as an end-portion end surface 382. Further, the end 381 of the stopper 38 is provided with a surface that faces substantially upward and is substantially parallel to the movement direction of the stopper 38 and the vehicle width direction. Hereinafter, the surface may be referred to as an end-portion upper surface 383. In addition, the stopper 38 is provided with a second lever engagement projection 384 that is engaged with the second lever 42. The second lever engagement projection 384 of the stopper 38 is a portion having a rod-shaped configuration protruding to the vehicle inner side, and is inserted into a stopper engagement hole 421 of the second lever 42 to be described later from the vehicle inner side to the vehicle outer side.

The stopper biasing spring 39 constantly elastically biases the stopper 38 to the proximal end. For example, a compressible and deformable coil spring is applied to the stopper biasing spring 39.

The actuator assembly 40 is a subassembly constituting the door handle device 20. The actuator assembly 40 includes the actuator 41 controlled by the ECU and the second lever 42 rotatable in both forward and reverse directions by a driving force of the actuator 41. The second lever 42 is rotatable (that is, reversely drivable) by being applied with an external force when the actuator 41 does not output the driving force. For example, an electric motor capable of outputting rotational power in both forward and reverse directions is applied to the actuator 41. As viewed in the vehicle width direction, the actuator assembly 40 is disposed such that a rotation center of the second lever 42 is located in front of the first lever 34 in the front-rear direction, and is located between the stopper 38 and a lower end of the first lever 34 in the upper-lower direction.

The second lever 42 is an elongated rod-shaped member, and is disposed such that a longitudinal direction of the second lever 42 is substantially parallel to the upper-lower direction. A rotation center line of the second lever 42 is substantially parallel to a rotation center line of the first lever 34. Therefore, when the second lever 42 rotates, an upper end of the second lever 42 moves substantially in the front-rear direction (the direction approaching the rotation center of the first lever 34 and the direction away from the rotation center of the first lever 34). Further, a lower end of the second lever 42 moves substantially in the front-rear direction. Then, the second lever 42 is movable to an initial position (see FIG. 5C), a first operation position (see FIG. 7B), and a second operation position (see FIG. 8B) by rotating.

An initial position of the second lever 42 is a position when the upper end of the second lever 42 is located at a front end of a movable range (more specifically, an end far from the rotation center of the first lever 34 in the movable range) and a lower end of the second lever 42 is located at a rear end of the movable range. The first operation position of the second lever 42 is a position when the upper end of the second lever 42 is located at the rear end of the movable range (more specifically, an end close to the rotation center of the first lever 34 in the movable range) and the lower end of the second lever 42 is located at the front end of the movable range. The second operation position is a position on a side slightly closer to the initial position than the first operation position. The second operation position is an example of an operation position disclosed here.

By a second lever biasing spring 43 that is a detent spring, the second lever 42 is elastically biased to the initial position when the second lever 42 is located closer to the initial position than a middle (a so-called turn-over point) of the movable range, and is elastically biased to the second operation position when the second lever 42 is located closer to the second operation position than the middle of the movable range.

The bell crank 44 is disposed on a rear side of the upper arm portion 342 of the first lever 34, and is rotatably supported by the base 31. A rotation center line of the bell crank 44 is substantially parallel to the rotation center line of the first lever 34. A front surface of the bell crank 44 faces a rear surface of the upper arm portion 342 of the first lever 34. The bell crank 44 is movable between a latch corresponding position and an unlatch corresponding position by rotating with respect to the base 31. The latch corresponding position is a position when the front surface of the bell crank 44 is located at a front end of a movement range. The unlatch corresponding position of the bell crank 44 is a position when the front surface of the bell crank 44 is located behind the latch corresponding position. The bell crank 44 is constantly elastically biased to the latch corresponding position by the bell crank biasing spring 45. When the first lever 34 is located at the storage corresponding position or the pop-up corresponding position, the front surface of the bell crank 44 is separated rearward from the upper arm portion 342 of the first lever 34 (see FIGS. 5B and 8B).

The bell crank 44 is connected to the door lock device 13 via the predetermined connecting member 14 (not illustrated). When the bell crank 44 moves from the latch corresponding position to the unlatch corresponding position, movement of the bell crank 44 is transmitted to the door lock device 13 via the connecting member 14. At this time, if the door lock device 13 is in an unlocked state, the latch mechanism of the door lock device 13 is switched from the latched state to the unlatched state.

Operation of Door Handle Device

Next, an operation of the door handle device 20 will be described.

State Where Door Handle Device is Not Used

Figure 5A:
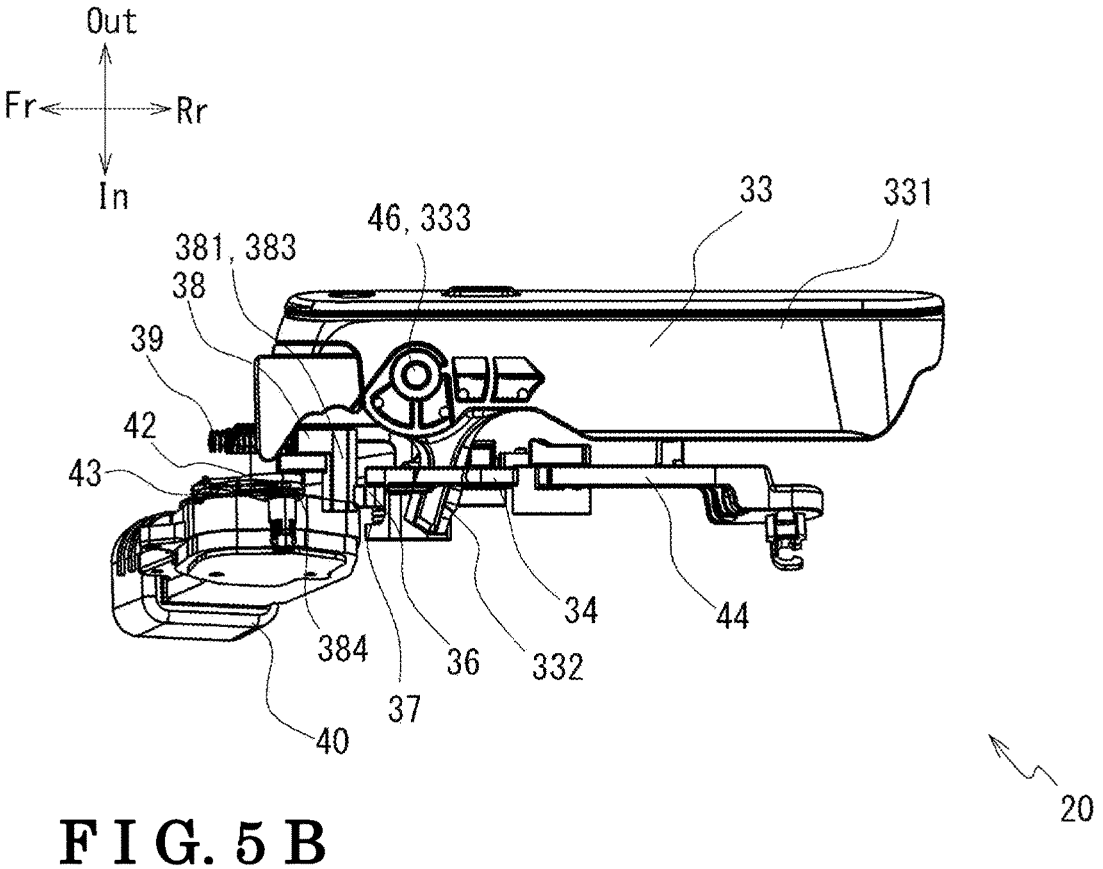
FIG. 5A is a top view illustrating an operation of the door handle device.
Figure 5B:
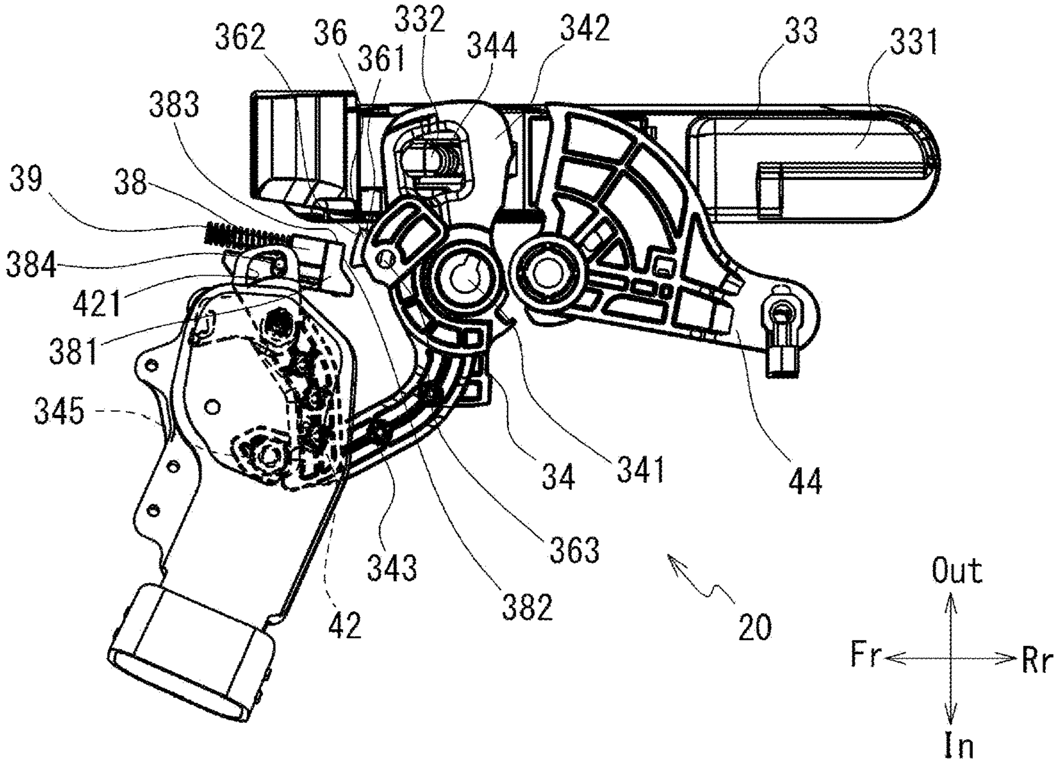
FIG. 5B is a side view illustrating the operation of the door handle device.
Figure 5C:
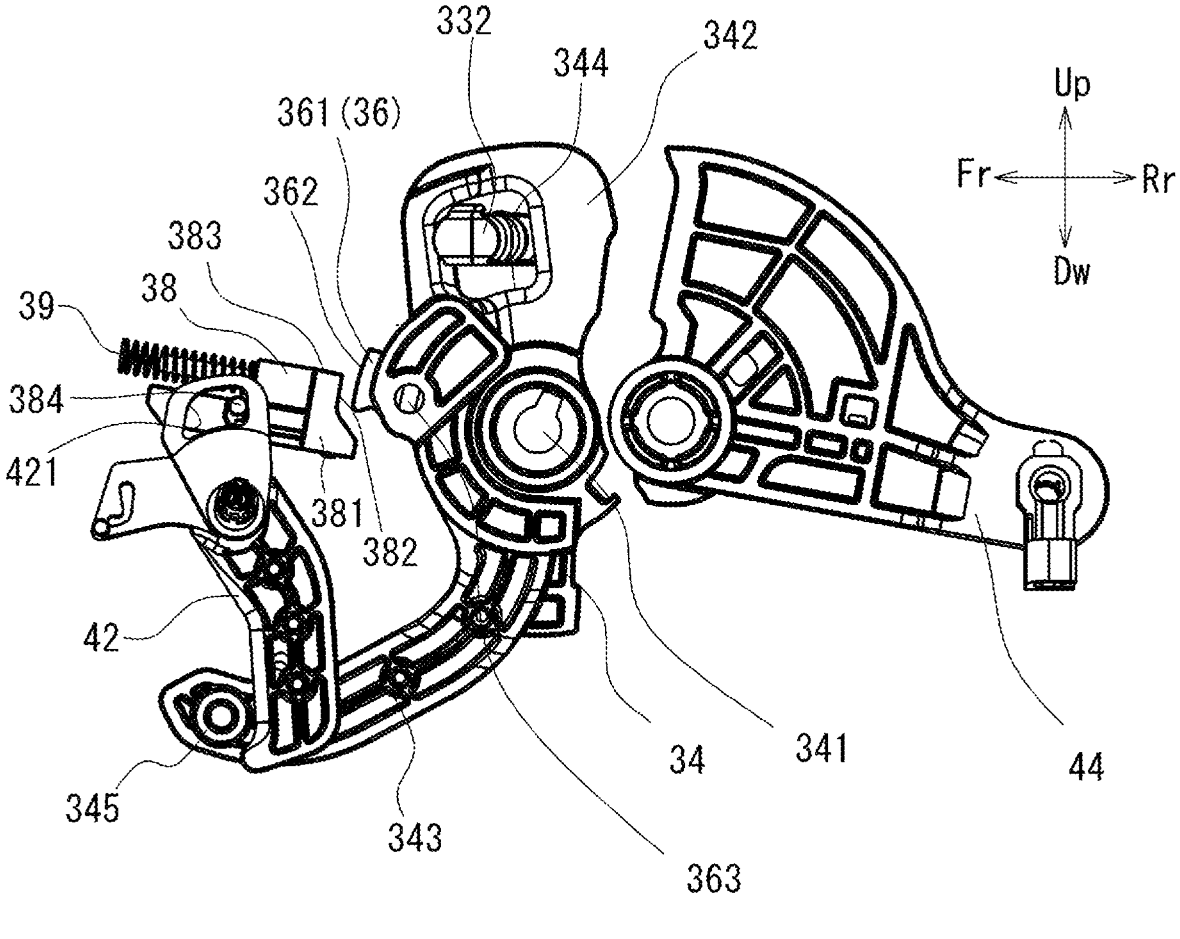
FIG. 5C is a side view illustrating the operation of the door handle device.

FIGS. 5A, 5B, and 5C are views illustrating a state where the door handle device 20 is not used. FIG. 5A is a top view in which the housing 30 is omitted (the same applies to FIGS. 6A, 7A, 8A, 9A, and 10A). FIG. 5B is a side view when viewed from the vehicle inner side, in which the housing 30 is omitted. FIG. 5C is a side view illustrating the first lever 34, the sub-lever 36, the stopper 38, the stopper biasing spring 39, the second lever 42, and the bell crank 44 when viewed from the vehicle inner side (the same applies to FIGS. 6B, 7B, 8B, 9B, and 10B). When the door handle device 20 is not used, as illustrated in FIGS. 5A, 5B, and 5C, the door handle 33 is located at the storage position, the first lever 34 is located at the storage corresponding position, the second lever 42 is located at the initial position, the stopper 38 is located at the distal end, and the sub-lever 36 is located at the first position.

As illustrated in FIG. 5A, the storage position of the door handle 33 is a position where the longitudinal direction of the grip portion 331 is substantially parallel to the front-rear direction. As illustrated in FIGS. 5B and 5C, when the second lever 42 is located at the initial position (in other words, when the second lever 42 is held at the initial position by a biasing force of the second lever biasing spring 43), the stopper 38 is held at the distal end by the second lever 42. Specifically, since the stopper 38 is constantly elastically biased to the proximal end by the stopper biasing spring 39, the second lever engagement projection 384 of the stopper 38 comes into contact with an inner peripheral surface of the stopper engagement hole 421 of the second lever 42 (more specifically, a surface in the inner peripheral surface of the stopper engagement hole 421 which is located on a front side in the movement direction when the second lever 42 moves from the initial position to the first operation position and the second operation position and faces a rear side in the movement direction). Therefore, the stopper 38 cannot move from the position to the proximal end. Therefore, the stopper 38 is held at the distal end.

At this time, the stopper 38 is located outside a movement trajectory of the sub-lever 36 (specifically, in front of the movement trajectory of the sub-lever 36). The "movement trajectory of the sub-lever 36" is a trajectory when the sub-lever 36 moves with respect to the base 31 together with the first lever 34. In this way, when the second lever 42 is located at the initial position, the stopper 38 is held outside the movement trajectory of the sub-lever 36. It can also be said that a position of the stopper 38 when the second lever 42 is located at the initial position (specifically, a position of the stopper 38 when the upper end of the second lever 42 is located at a farthest position from the rotation center of the first lever 34) is a position on the distal end.

When the first lever 34 is located at the storage corresponding position, the lower end of the stopper engagement portion 361 of the sub-lever 36 is located within a movement trajectory of the stopper 38. On the other hand, when the stopper 38 is located at the distal end, the end 381 of the stopper 38 is located outside the movement trajectory of the sub-lever 36. Therefore, when the first lever 34 is located at the storage corresponding position and the stopper 38 is located at the distal end, the end-portion end surface 382 of the stopper 38 and the front surface 362 of the stopper engagement portion 361 of the sub-lever 36 face each other but are not in contact with each other, and are separated from each other by a predetermined distance in the movement direction of the stopper 38.

When the second lever 42 is located at the initial position, the lower end of the second lever 42 is located immediately behind the second lever engagement projection 345 of the lower arm portion 343 of the first lever 34 located at the storage corresponding position. More specifically, the lower end of the second lever 42 is located immediately close to the "rear side in the movement direction of the second lever engagement projection 345 of the first lever 34 when the first lever 34 moves from the storage corresponding position to the pop-up corresponding position". Therefore, when the second lever 42 is located at the initial position, the first lever 34 is allowed to be located at the storage corresponding position without being restricted by the second lever 42. Therefore, when the second lever 42 is located at the initial position, the door handle 33 is held at the storage position and the first lever 34 is held at the storage corresponding position by the biasing force of the door handle biasing spring 47. It can also be said that the initial position of the second lever 42 is a position where the first lever 34 is allowed to be located at the storage corresponding position.

When the first lever 34 is located at the storage corresponding position, the bell crank 44 is held at the initial position. Specifically, as illustrated in FIG. 5B, when the first lever 34 is located at the storage corresponding position, the upper arm portion 342 of the first lever 34 is located in front of the bell crank 44 located at the initial position. Therefore, when the first lever 34 is located at the storage corresponding position, the bell crank 44 can be located at the initial position without being restricted by the first lever 34. Therefore, in this case, the bell crank 44 is held at the initial position by a biasing force of the bell crank biasing spring 45.

Movement of Door Handle from Storage Position to Pop-Up Position

Figure 6A:
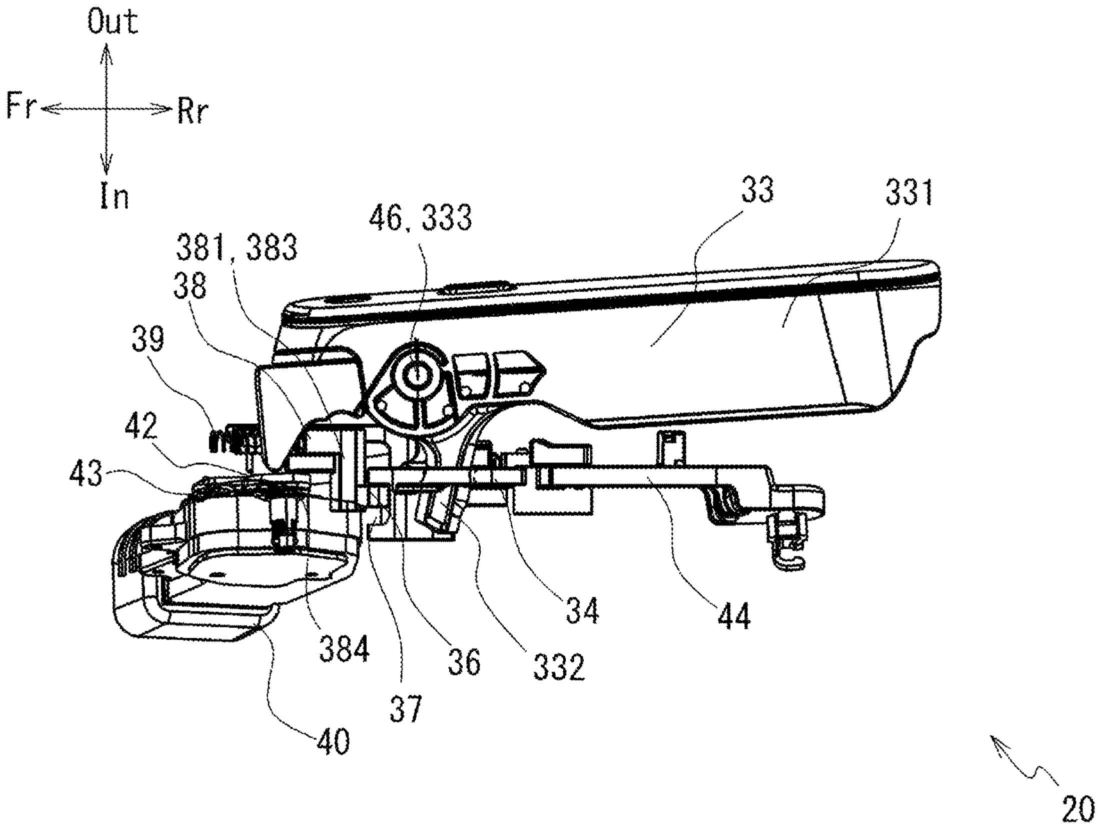
FIG. 6A is a top view illustrating an operation of the door handle device.
Figure 6B:
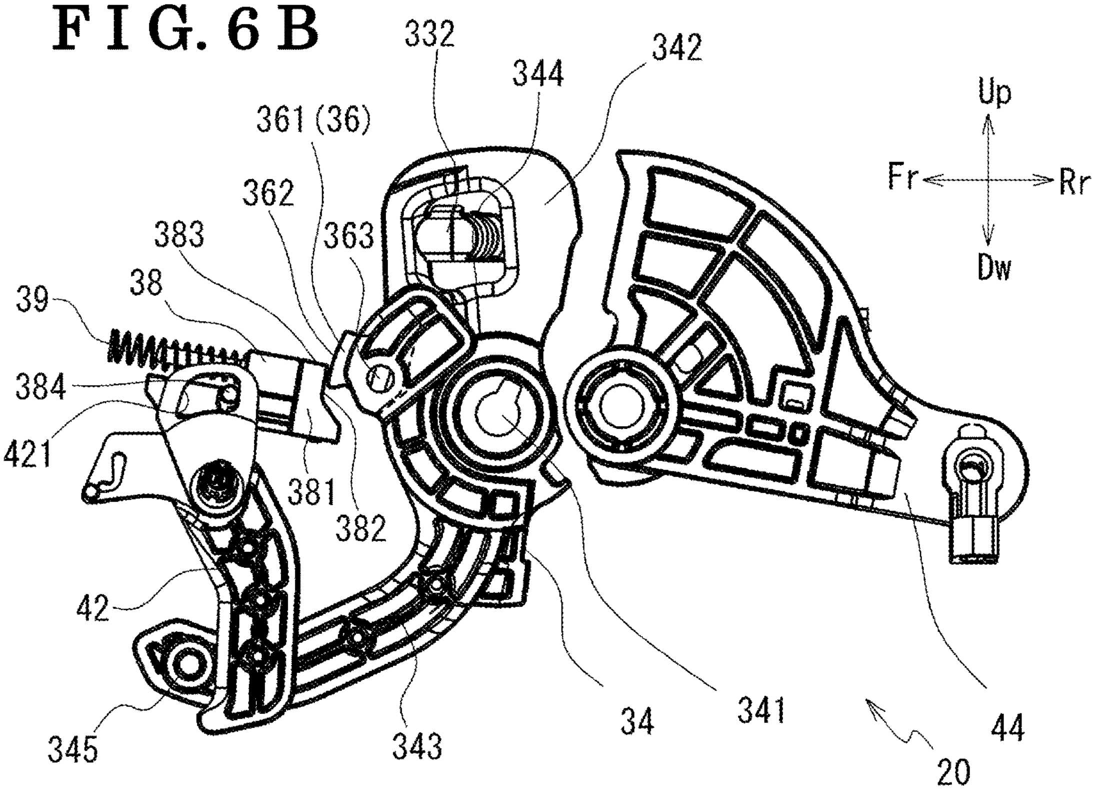
FIG. 6B is a side view illustrating the operation of the door handle device.

FIGS. 6A and 6B are views illustrating a state where the second lever 42 is moving from the initial position to the first operation position by the driving force of the actuator 41 and a state where the second lever 42 is located between the initial position and the second operation position.

When the second lever 42 moves from the initial position to the first operation position and the second operation position (rotates clockwise in FIGS. 5C and 6B), the lower end of the second lever 42 presses the second lever engagement projection 345 of the first lever 34 substantially forward. Therefore, the first lever 34 moves from the storage corresponding position to the pop-up corresponding position. Then, since an inner peripheral surface of the arm portion engagement hole 344 of the first lever 34 presses the arm portion 332 of the door handle 33 rearward, the door handle 33 moves from the storage position to the pop-up position. Further, when the first lever 34 moves from the storage corresponding position to the pop-up corresponding position, the sub-lever 36 supported by the first lever 34 moves upward as the first lever 34 moves.

When the second lever 42 moves from the initial position (see FIG. 5C) to the first operation position and the second operation position, the inner peripheral surface of the stopper engagement hole 421 of the second lever 42 approaches the rotation center of the first lever 34. Therefore, the stopper 38 moves to the proximal end in conjunction with the movement of the second lever 42 by a biasing force of the stopper biasing spring 39.

When the first lever 34 moves from the storage corresponding position to the pop-up corresponding position as the second lever 42 moves, the sub-lever 36 moves upward to come out of the movement trajectory of the stopper 38. However, when the sub-lever 36 does not come out of the movement trajectory of the stopper 38 at a time point at which the stopper 38 reaches the movement trajectory of the sub-lever 36, as illustrated in FIG. 6B, the end-portion end surface 382 of the stopper 38 comes into contact with the front surface 362 of the stopper engagement portion 361 of the sub-lever 36. Hereinafter, a position of the stopper 38 when the stopper 38 illustrated in FIGS. 6A and 6B comes into contact with the front surface 362 of the stopper engagement portion 361 of the sub-lever 36 may be referred to as a turning position. Since the stopper 38 cannot move from the turning position to the proximal end, the stopper 38 stops moving. Since a dimension of the stopper engagement hole 421 of the second lever 42 in the front-rear direction is larger than a dimension of the second lever engagement projection 384 of the stopper 38 in the front-rear direction, the second lever 42 and the stopper 38 are allowed to move relative to each other to a certain extent in the front-rear direction. Therefore, even when the stopper 38 stops moving because the end-portion end surface 382 of the stopper 38 comes into contact with the front surface 362 of the stopper engagement portion 361 of the sub-lever 36, the second lever 42 can move to the first operation position and the second operation position. A position between the turning position of the stopper 38 and the distal end is an example of an out-of-trajectory position disclosed here, and a position between the turning position of the stopper 38 and the proximal end is an example of an in-trajectory position disclosed here.

When the second lever 42 further moves from a position illustrated in FIG. 6B to the first operation position and the second operation position, the first lever 34 also further moves from a position illustrated in FIG. 6B to the pop-up corresponding position. The front surface 362 of the stopper engagement portion 361 of the sub-lever 36 is the arc-shaped curved surface about the rotation center of the first lever 34. On the other hand, the end-portion end surface 382 of the stopper 38 is a flat surface substantially perpendicular to the movement direction of the stopper 38. Therefore, even when the end-portion end surface 382 of the stopper 38 comes into contact with the front surface 362 of the stopper engagement portion 361 of the sub-lever 36, the sub-lever 36 is not restricted by the stopper 38, and can move together with the first lever 34 while drawing an arc track about the rotation center of the first lever 34. Therefore, the first lever 34 can move to the pop-up corresponding position without being restricted by the stopper 38.

Figure 7A:
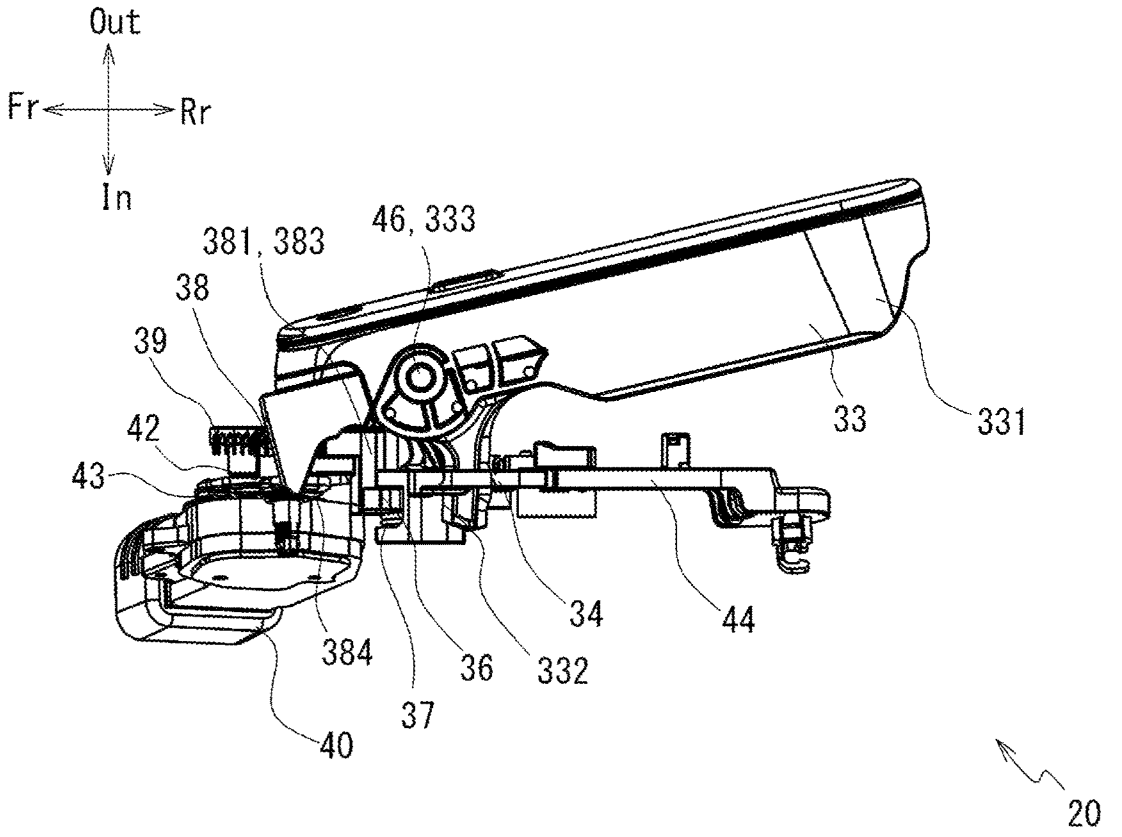
FIG. 7A is a top view illustrating an operation of the door handle device.
Figure 7B:
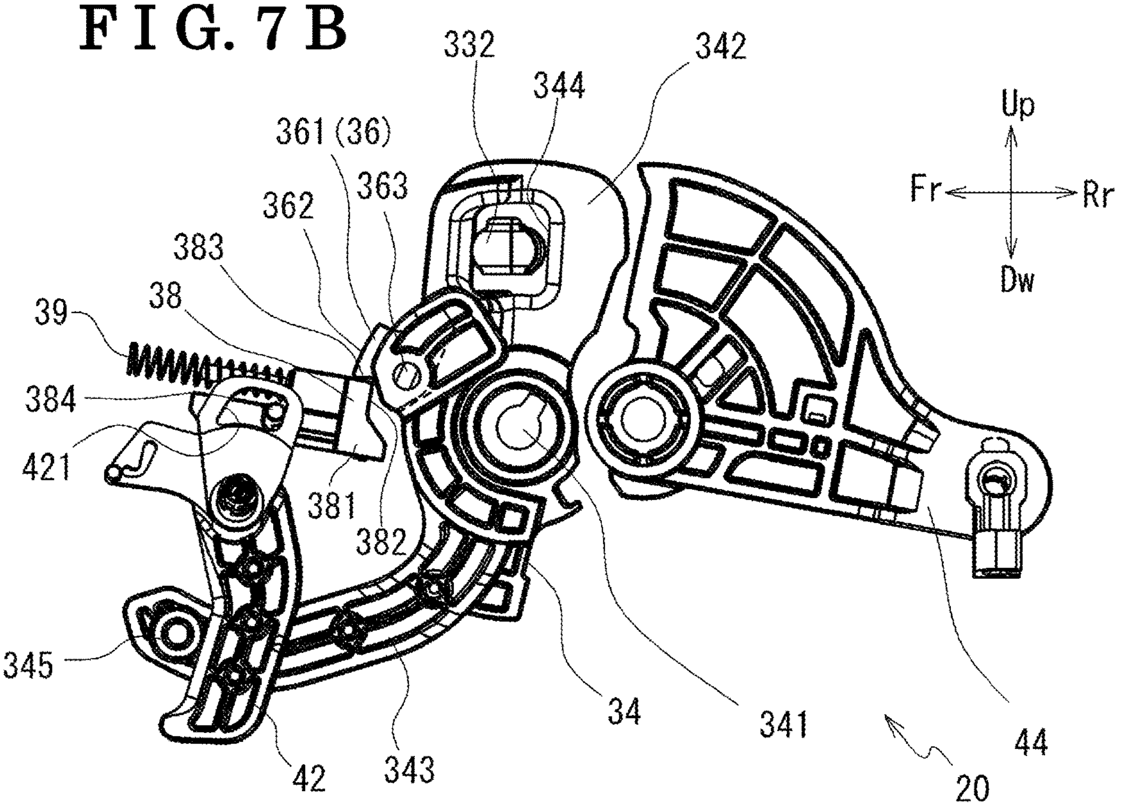
FIG. 7B is a side view illustrating the operation of the door handle device.

FIGS. 7A and 7B are views illustrating a state where the second lever 42 is located at the second operation position by the second lever 42 further rotating from the state illustrated in FIGS. 6A and 6B. When the second lever 42 reaches the second operation position from the initial position, the first lever 34 reaches the pop-up corresponding position. Then, when the first lever 34 is located at the pop-up corresponding position, the stopper engagement portion 361 of the sub-lever 36 is located outside the movement trajectory of the stopper 38 (in the present embodiment, above the end 381 of the stopper 38). Therefore, as illustrated in FIG. 7B, the stopper 38 is not restricted by the sub-lever 36, and moves to the proximal end by the biasing force of the stopper biasing spring 39 and held at the proximal end. That is, the stopper 38 is located at the in-trajectory position. The lower end of the stopper engagement portion 361 of the sub-lever 36 comes into contact with the end-portion upper surface 383 of the stopper 38.

A position of the second lever 42 at this time is the second operation position, and a position of the first lever 34 at this time is the pop-up corresponding position. It can also be said that the pop-up corresponding position of the first lever 34 is a position when the lower end of the stopper engagement portion 361 of the sub-lever 36 located at the first position comes into contact with the end-portion upper surface 383 of the stopper 38. Further, as is clear from FIG. 7B, when the second lever 42 is located at the second operation position, the first lever 34 cannot move to the storage corresponding position. Therefore, it can also be said that the second operation position of the second lever 42 is a position where the movement of the first lever 34 from the pop-up corresponding position to the storage corresponding position is restricted.

Figure 8A:
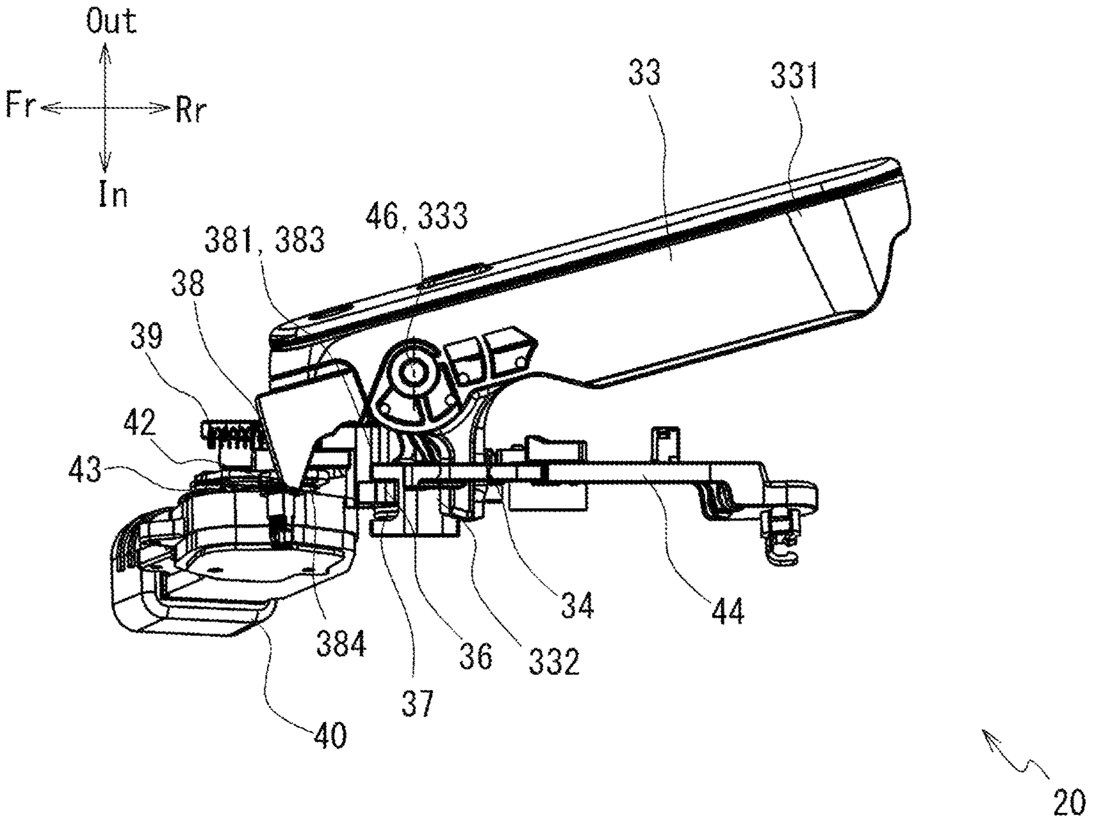
FIG. 8A is a top view illustrating an operation of the door handle device.
Figure 8B:
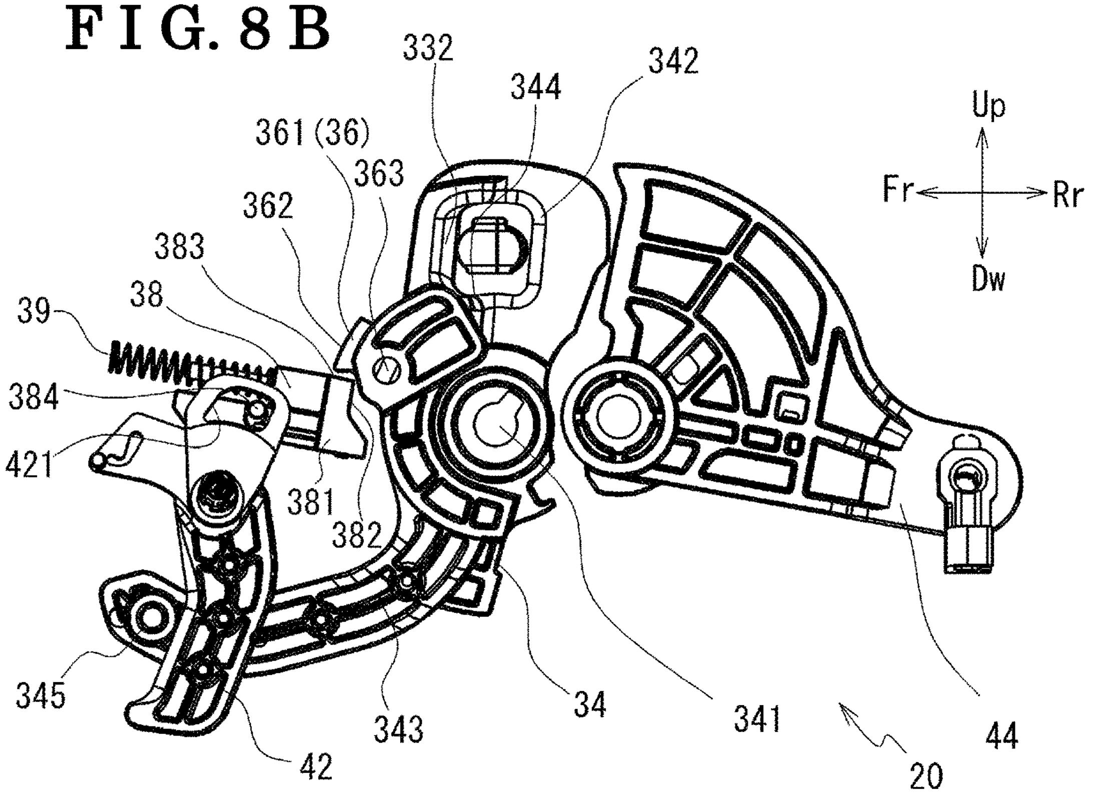
FIG. 8B is a side view illustrating the operation of the door handle device.

At a time point at which the second lever 42 reaches the second operation position, the stopper 38 may not move from the turning position to the proximal end due to a tolerance of each member. Then, to reliably move the stopper 38 to the proximal end, the actuator 41 does not stop the second lever 42 at the second operation position and moves the second lever 42 to the first operation position beyond the second operation position. FIGS. 8A and 8B are views illustrating a state where the second lever 42 moves to the first operation position. When the second lever 42 is located at the first operation position beyond the second operation position, the first lever 34 is located closer to the manually unlatched corresponding position than the pop-up corresponding position. Therefore, the lower end of the stopper engagement portion 361 of the sub-lever 36 is separated upward from the end-portion upper surface 383 of the stopper 38 by a predetermined distance. Therefore, it can also be said that the first operation position of the second lever 42 is a position where the first lever 34 is held closer to the manually unlatched corresponding position than the pop-up corresponding position.

In this way, by moving the first lever 34 closer to the manually unlatched corresponding position by a predetermined distance from the pop-up corresponding position, interference between the stopper 38 and the sub-lever 36 can be avoided, and the stopper 38 can reliably move to the proximal end by the biasing force of the stopper biasing spring 39. When the first lever 34 is located slightly closer to the manually unlatched corresponding position from the pop-up corresponding position, the door handle 33 is located slightly closer to the manually unlatched position from the pop-up position.

A distance (rotation angle) between the first operation position and the second operation position of the second lever 42 is not particularly limited and may be set as appropriate. Specifically, the distance may be any distance as long as the stopper engagement portion 361 of the sub-lever 36 is reliably separated from the end-portion upper surface 383 of the stopper 38 when the second lever 42 is located at the first operation position.

Holding of Door Handle at Pop-Up Position

As illustrated in FIGS. 8A and 8B, after the second lever 42 reaches the first operation position, when the actuator 41 stops driving the second lever 42 (when the driving force is not provided), as illustrated in FIGS. 7A and 7B, the first lever 34 moves (returns) to the pop-up corresponding position and the door handle 33 moves (returns) to the pop-up position by the biasing force of the door handle biasing spring 47.

When the first lever 34 is located at the pop-up corresponding position, the lower end of the stopper engagement portion 361 of the sub-lever 36 comes into contact with the end-portion upper surface 383 of the stopper 38. When the lower end of the stopper engagement portion 361 of the sub-lever 36 comes into contact with the end-portion upper surface 383 of the stopper 38, the stopper engagement portion 361 of the sub-lever 36 cannot move from the position to a lower side (more specifically, a front side in the movement direction of the sub-lever 36 when the first lever 34 moves from the pop-up corresponding position to the storage corresponding position). Then, since the sub-lever 36 cannot move to the lower side, the first lever 34 is also restricted from moving from the pop-up corresponding position to the storage corresponding position. Since the door handle 33 is constantly elastically biased to the storage position by the door handle biasing spring 47, the door handle 33 is held at the pop-up position when an external force for pulling out the door handle 33 to the manually unlatched position is not applied to the door handle 33.

When the door handle 33 is located at the pop-up position and an external force for pushing the door handle 33 to the vehicle inner side (that is, an external force for moving the door handle 33 to the storage position) is applied to the door handle 33, a force for moving the first lever 34 from the pop-up corresponding position to the storage corresponding position is applied to the first lever 34 via the door handle 33. However, since the lower end of the stopper engagement portion 361 of the sub-lever 36 comes into contact with the end-portion upper surface 383 of the stopper 38, the sub-lever 36 cannot move to the lower side from the position. However, since the first lever 34 can move relative to the lower side with respect to the sub-lever 36 by the sub-lever 36 moving from the first position to the second position with respect to the first lever 34, the first lever 34 can move from the pop-up corresponding position to the storage corresponding position.

At this time, since the biasing force of the sub-lever biasing spring 37 acts in a direction in which the first lever 34 is biased to the pop-up position, the door handle 33 is biased to the pop-up position. Therefore, when a force for moving the first lever 34 from the pop-up corresponding position to the storage corresponding position is smaller than the biasing force of the sub-lever biasing spring 37, the first lever 34 does not move from the pop-up corresponding position to the storage corresponding position. Therefore, in this case, the door handle 33 is held at the pop-up position.

In this way, when the door handle 33 is located at the pop-up position, the biasing force of the sub-lever biasing spring 37 acts as a holding force for holding the door handle 33 at the pop-up position. Strictly, the door handle 33 is constantly elastically biased to the storage position by the biasing force of the door handle biasing spring 47, the first lever 34 is constantly elastically biased to the manually unlatched position by the first lever biasing spring 35, and the second lever 42 is held to be located at the second operation position by the second lever biasing spring 43 when located at the second operation position. Therefore, the biasing force of the first lever biasing spring 35 and the biasing force of the second lever biasing spring 43 act as a force for holding the door handle 33 at the pop-up position, and the biasing force of the door handle biasing spring 47 acts as a force for moving the door handle 33 to the storage position.

Therefore, strictly, the holding force for holding the door handle 33 at the pop-up position is a force obtained by adding the biasing force of the first lever biasing spring 35 and the biasing force of the second lever biasing spring 43 to the biasing force of the sub-lever biasing spring 37 and subtracting the biasing force of the door handle biasing spring 47. The biasing force of the sub-lever biasing spring 37 is larger than the biasing force of the door handle biasing spring 47 so that the door handle 33 can be held at the pop-up position by the biasing force of the sub-lever biasing spring 37. Strictly, the biasing force of the sub-lever biasing spring 37 is larger than a "force obtained by subtracting the biasing forces of the first lever biasing spring 35 and the second lever biasing spring 43 from the biasing force of the door handle biasing spring 47".

The end-portion upper surface 383 of the stopper 38 is a flat surface substantially parallel to the movement direction of the stopper 38 and the vehicle width direction. According to such a configuration, even when the lower end of the sub-lever 36 is pressed against the end-portion upper surface 383 of the stopper 38, a force received by the stopper 38 from the sub-lever 36 does not act in a direction in which the stopper 38 is moved to the distal end or the proximal end. Therefore, the stopper 38 is prevented from moving out of the movement trajectory of the stopper engagement portion 361 of the sub-lever 36 by the force received by the stopper 38 from the sub-lever 36, and thus the first lever 34 is held at the pop-up corresponding position. It is preferable that the end-portion upper surface 383 of the stopper 38 and the movement trajectory of the lower end of the stopper engagement portion 361 of the sub-lever 36 are substantially orthogonal to each other as viewed in the vehicle width direction. According to such a configuration, it is possible to enhance reliability of an effect of preventing the stopper 38 from moving out of the movement trajectory of the stopper engagement portion 361 of the sub-lever 36.

When the first lever 34 is located at the pop-up corresponding position, the first lever 34 and the bell crank 44 are separated from each other by a predetermined distance in the front-rear direction similar to when the first lever 34 is located at the storage corresponding position. Therefore, the bell crank 44 is held at the initial position by the bell crank biasing spring 45.

Figure 9A:
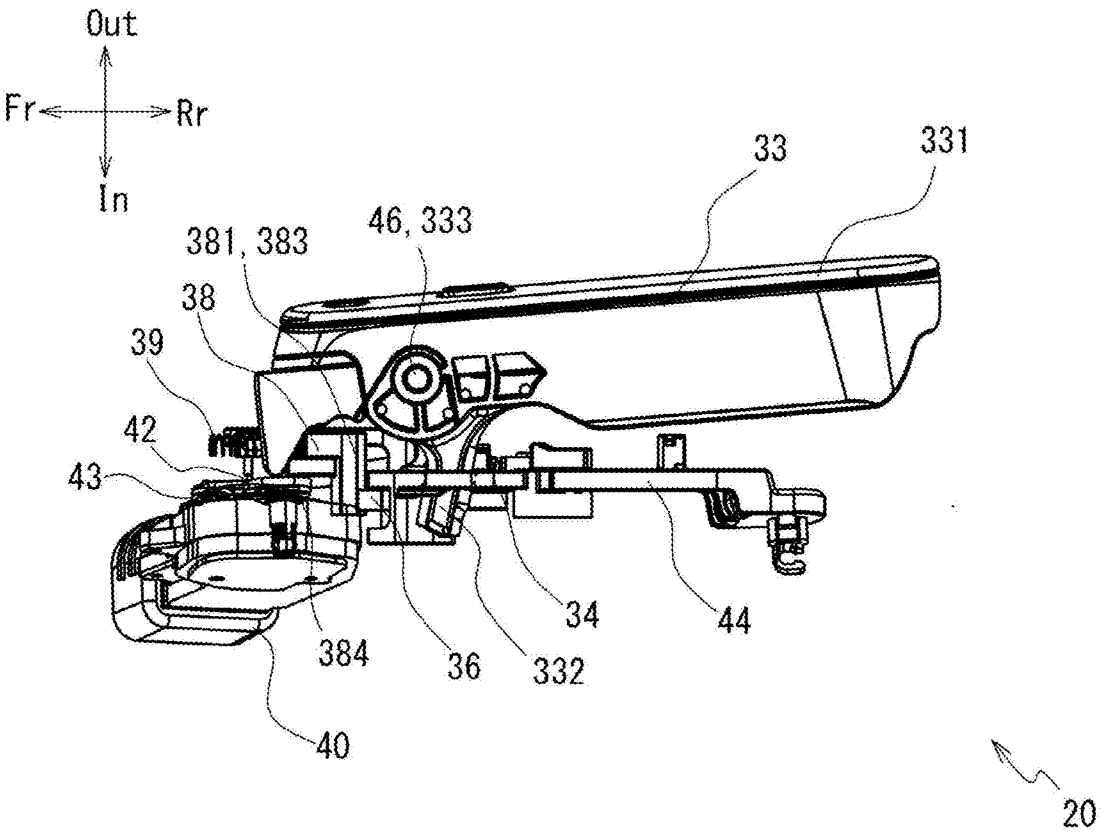
FIG. 9A is a top view illustrating an operation of the door handle device.
Figure 9B:
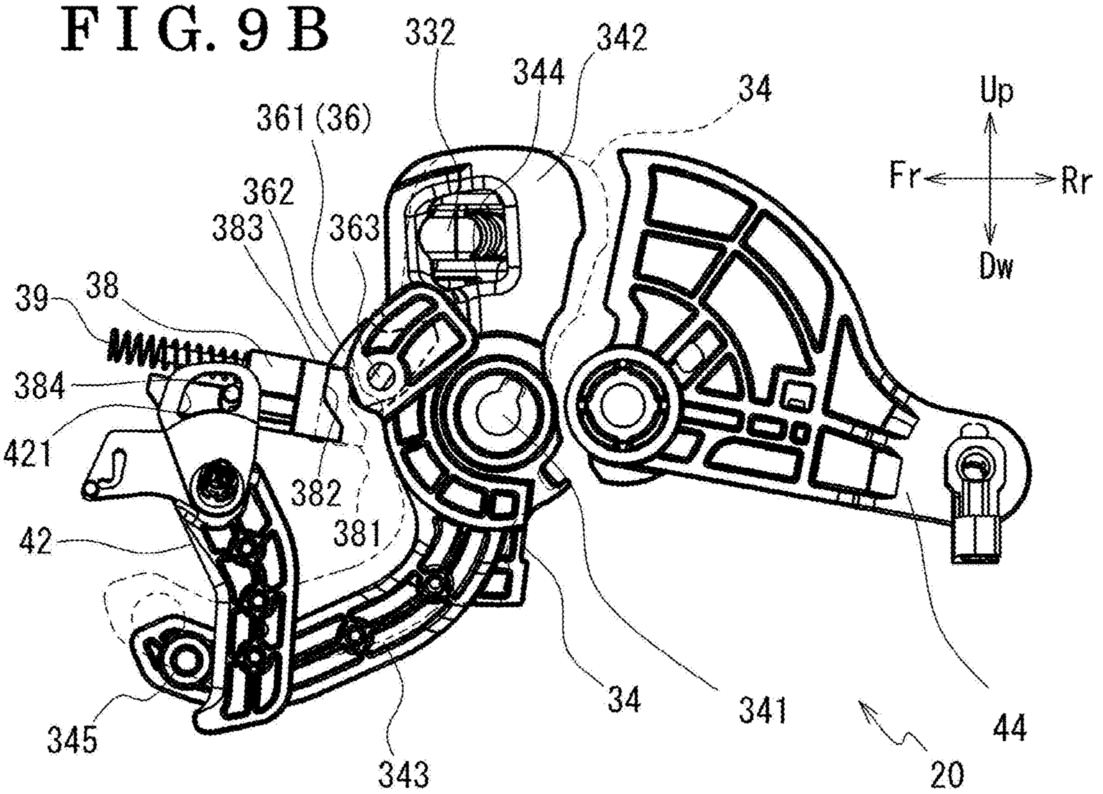
FIG. 9B is a side view illustrating the operation of the door handle device.

Movement from Pop-Up Position to Storage Position by Manual Operation of Door Handle FIGS. 9A and 9B are views illustrating a state where the door handle 33 is moving from the pop-up position to the storage position by a manual operation of the door handle 33 and a state at a time point when the stopper reaches the turning position. In FIG. 9B, the first lever 34 located at the pop-up corresponding position and the end 381 of the stopper 38 located at the proximal end are indicated by broken lines.

When the door handle 33 is located at the pop-up position and an external force larger than the holding force is applied, the first lever 34 moves from the pop-up corresponding position to the storage corresponding position against the biasing force of the sub-lever biasing spring 37 in a state where the stopper engagement portion 361 of the sub-lever 36 comes into contact with the end-portion upper surface 383 of the stopper 38 by the external force. Then, when the first lever 34 moves from the pop-up corresponding position to the storage corresponding position, the second lever engagement projection 345 of the first lever 34 pushes the lower end of the second lever 42 to the rear side, and thus the second lever 42 moves from the second operation position to the initial position. When the second lever 42 moves from the second operation position to the initial position, the inner peripheral surface of the stopper engagement hole 421 of the second lever 42 pushes the second lever engagement projection 384 of the stopper 38 toward a distal end side (an out-of-trajectory position side). Therefore, the stopper 38 moves to the distal end.

When the stopper 38 reaches the turning position, the stopper 38 is located outside the movement trajectory of the sub-lever 36. Therefore, the stopper engagement portion 361 of the sub-lever 36 is separated from the end-portion upper surface 383 of the stopper 38. As a result, since a "holding force at the pop-up corresponding position" by the sub-lever biasing spring 37 is not applied to the first lever 34, the first lever 34 can move to the storage corresponding position with almost no load. The door handle 33 moves to the storage position by an external force (the biasing force of the door handle biasing spring 47 when the external force is not applied) for pushing the grip portion 331 of the door handle 33 to the vehicle inner side. Therefore, the door handle device 20 returns to the state illustrated in FIGS. 5A, 5B, and 5C. As described above, in the state illustrated in FIGS. 5A, 5B, and 5C, the door handle 33 is held at the storage position by the biasing force of the door handle biasing spring 47. In this way, the door handle device 20 is configured such that the door handle 33 moves from the pop-up position to the storage position when a force larger than the holding force is applied to the door handle 33.

According to such a configuration, it is possible to stabilize the holding force for positioning the door handle 33 at the pop-up position. That is, a magnitude of the holding force for holding the door handle 33 at the pop-up position is mainly defined by a magnitude of the biasing force of the sub-lever biasing spring 37. When the sub-lever biasing spring 37 is a mechanical spring, the holding force can be stabilized because the holding force is less varied due to environmental changes, changes in a contact state between members constituting the door handle device 20, or the like.

When the holding force for holding the door handle 33 at the pop-up position is excessively small, for example, the door handle 33 may move from the pop-up position to the storage position when the user touches the grip portion 331 to grip the grip portion 331. On the other hand, when the holding force is excessively large, a large force is required when the door handle 33 moves from the pop-up position to the storage position, and as a result, the door handle 33 may move at an excessively high speed when the door handle 33 moves to the storage position. Therefore, the holding force is preferably set to an appropriate magnitude. Further, according to the present embodiment, the magnitude of the holding force can be defined mainly by setting a spring constant of the sub-lever biasing spring 37, and therefore the holding force is easily set to an appropriate magnitude.

In this operation, a force for pressing the stopper 38 downward is applied to the stopper 38 from the stopper engagement portion 361 of the sub-lever 36. As described above, the stopper support portion 314 of the base 31 includes the stopper support surface 316 extending substantially in the front-rear direction and facing upward, and therefore the force is received by the stopper support surface 316. Therefore, even when the force for pressing the stopper 38 downward is applied to the stopper 38 from the sub-lever 36, stable movement (in other words, smooth movement) of the stopper 38 is ensured. As a contact area between the lower surface of the stopper 38 and the stopper support surface 316 increases, the movement of the stopper 38 is more stable. Therefore, as illustrated in the drawings, the movement of the stopper 38 can be further stabilized by protruding a portion on a lower side of the end-portion end surface 382 of the end 381 of the stopper 38 toward the rotation center of the first lever 34 to increase the contact area between the lower surface of the stopper 38 and the stopper support surface 316.

Movement of Door Handle from Pop-Up Position to Storage Position by Driving Force of Actuator When the door handle device 20 is in the state illustrated in FIGS. 7A and 7B and the second lever 42 moves from the second operation position to the initial position by the driving force of the actuator 41, the second lever engagement projection 384 of the stopper 38 is pressed by the inner peripheral surface of the stopper engagement hole 421 of the second lever 42, and the stopper 38 moves from the proximal end to the distal end against the biasing force of the stopper biasing spring 39. However, until the stopper 38 reaches the turning position (see FIG. 9B), the lower end of the stopper engagement portion 361 of the sub-lever 36 comes into contact with the end-portion upper surface 383 of the stopper 38.

Therefore, the first lever 34 is held at the pop-up corresponding position, and as a result, the door handle 33 is held at the pop-up position. When the second lever 42 moves from the second operation position to the initial position, the lower end of the second lever 42 moves in a direction away from the second lever engagement projection 345 of the first lever 34 located at the storage corresponding position. Therefore, in a state where the first lever 34 is located at the storage corresponding position, the second lever 42 can move from the operation position to the initial position. In other words, the second lever 42 can move from the operation position to the initial position without being restricted by the first lever 34.

Further, when the stopper 38 is located at the out-of-trajectory position (a position on a distal end side relative to the turning position), the movement of the sub-lever 36 is no longer restricted by the stopper 38. Therefore, the first lever 34 moves from the pop-up corresponding position to the storage corresponding position by the biasing force of the door handle biasing spring 47 transmitted via the door handle 33, and the door handle 33 moves from the pop-up position to the storage position. As a result, the door handle device 20 is in the state illustrated in FIGS. 5A, 5B, and 5C. In this way, the door handle device 20 is configured such that the door handle 33 moves from the pop-up position to the storage position when the second lever 42 moves from the second operation position to the initial position.

Movement of Door Handle to Manually Unlatched Position

Figure 10A:
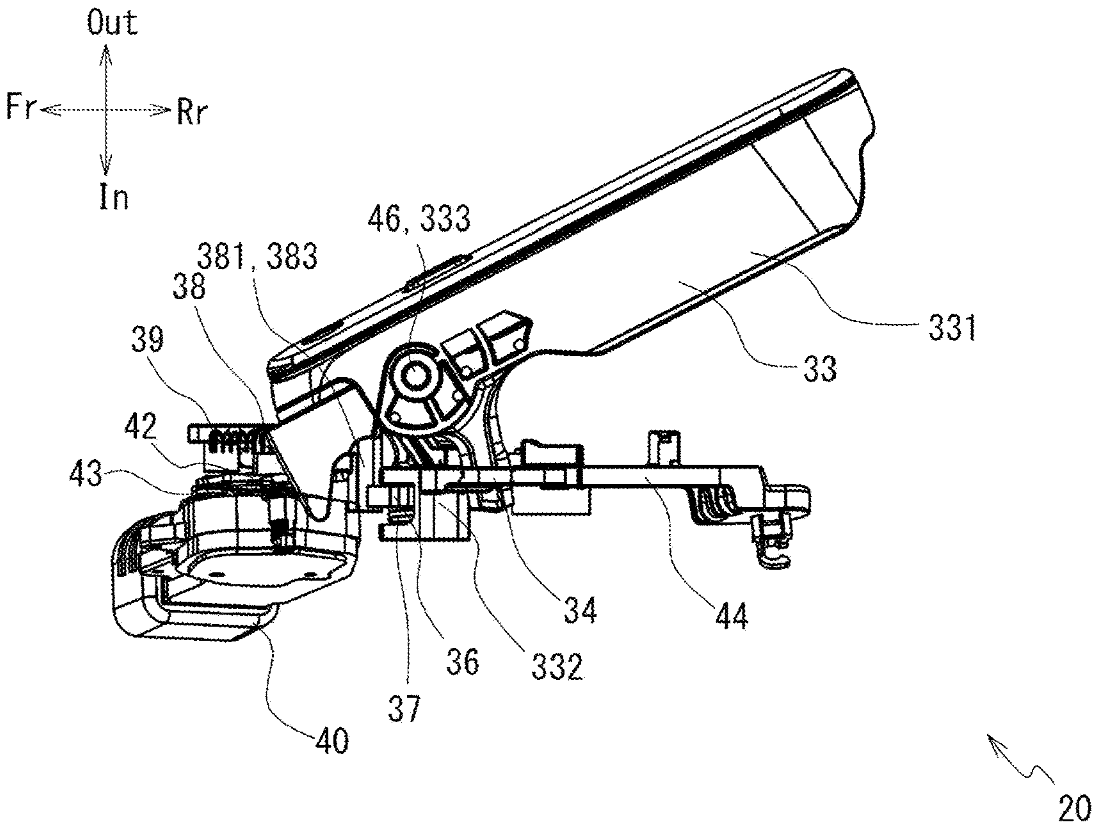
FIG. 10A is a top view illustrating an operation of the door handle device.
Figure 10B:
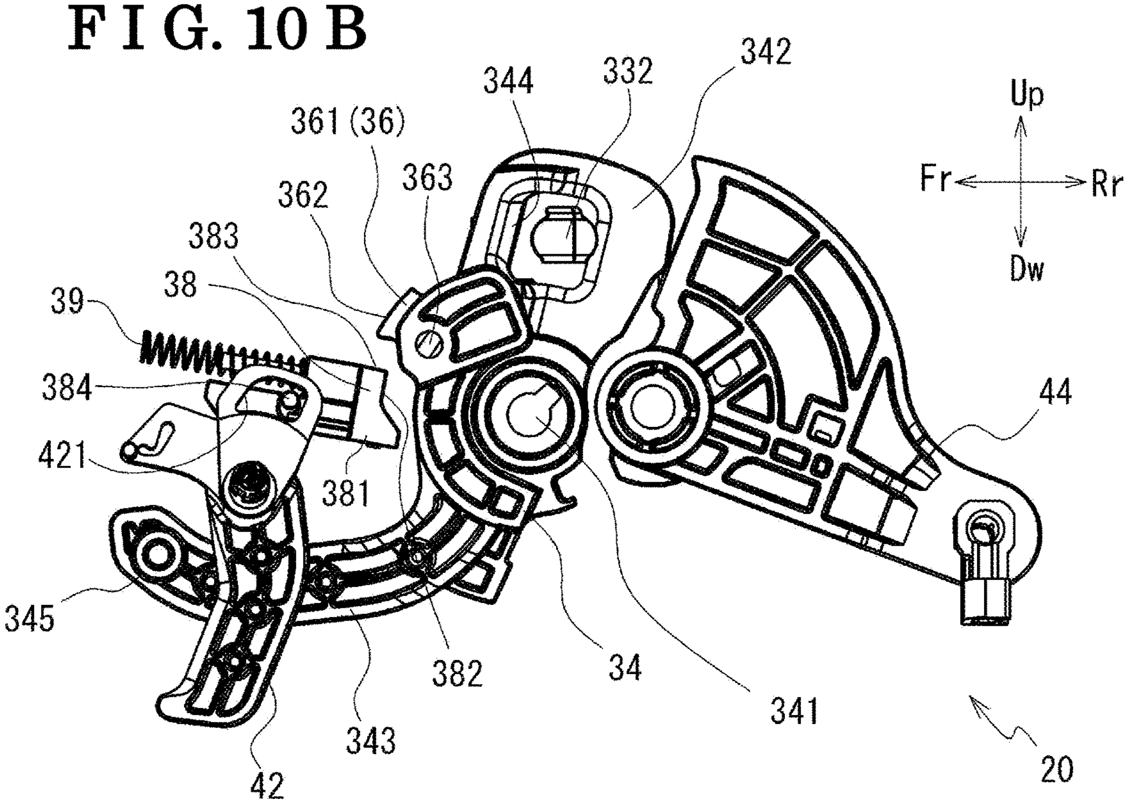
FIG. 10B is a side view illustrating the operation of the door handle device.

The user can move the door handle 33 from the pop-up position to the manually unlatched position by further pulling out the door handle 33 located at the pop-up position to the vehicle outer side. FIGS. 10A and 10B are views illustrating a state where the door handle 33 is located at the manually unlatched position.

When the door handle 33 moves from the pop-up position to the manually unlatched position by the manual operation of the user, the arm portion 332 of the door handle 33 presses the inner peripheral surface of the arm portion engagement hole 344 of the first lever 34 rearward, and thus the first lever 34 moves from the pop-up corresponding position to the manually unlatched corresponding position. When moving from the pop-up corresponding position to the manually unlatched corresponding position, the first lever 34 pushes the bell crank 44 to move the bell crank 44 from the initial position to the operation position. At this time, if the door lock device 13 is in the unlocked state, the door lock device 13 is switched from the latched state to the unlatched state by the movement of the bell crank 44 transmitted via the connecting member 14.

When the first lever 34 moves from the pop-up corresponding position to the manually unlatched corresponding position, the second lever engagement projection 345 of the first lever 34 moves away from the lower end of the second lever 42 to the front side. The stopper engagement portion 361 of the sub-lever 36 is further separated upward from the movement trajectory of the stopper 38. Therefore, the first lever 34 can move from the pop-up corresponding position to the manually unlatched corresponding position without being restricted by the second lever 42 and the stopper 38. When the first lever 34 moves from the pop-up corresponding position to the manually unlatched corresponding position, the second lever 42 is held at the second operation position by the second lever biasing spring 43, and the stopper 38 is held at the proximal end by the biasing force of the stopper biasing spring 39.

When the door handle 33 is located at the manually unlatched position, when the user releases the door handle 33, the door handle 33 moves to a side of the pop-up position and the storage position by the biasing force of the door handle biasing spring 47, and the first lever 34 moves to a side of the pop-up corresponding position and the storage corresponding position in conjunction with the movement of the door handle 33. At this time, since the stopper 38 is located within the movement trajectory of the sub-lever 36, when the first lever 34 reaches the pop-up corresponding position, the lower end of the stopper engagement portion 361 of the sub-lever 36 comes into contact with the end-portion upper surface 383 of the stopper 38. Therefore, the first lever 34 cannot move further to the side of the storage corresponding position by the biasing force of the door handle biasing spring 47. That is, the first lever 34 stops at the pop-up corresponding position, and the door handle 33 stops at the pop-up position. Therefore, the door handle device 20 returns to the state illustrated in FIGS. 7A and 7B.

According to an aspect of this disclosure, a vehicle door handle device includes:

- a door handle supported by a housing to be movable between a storage position where the door handle is stored in the housing and a pop-up position where at least a part of the door handle jumps out of the housing;
- a first member configured to move in conjunction with the door handle such that the first member is located at a storage corresponding position when the door handle is located at the storage position and is located at a pop-up corresponding position when the door handle is located at the pop-up position;
- a second member supported movably with respect to the first member;
- a second member biasing member configured to bias the second member to be elastically movable with respect to the first member; and
- a third member movable between an out-of-trajectory position and an in-trajectory position, the out-of-trajectory position being a position outside a movement trajectory of the second member when the first member moves from the pop-up corresponding position to the storage corresponding position, the in-trajectory position being a position where at least a part of the third member enters the movement trajectory, in which
- when the first member is located at the pop-up corresponding position and the third member is located at the in-trajectory position, the first member is restricted from moving from the pop-up corresponding position to the storage corresponding position by the second member coming into contact with the third member.

According to this disclosure, the second member elastically biased by the second member biasing member comes into contact with the third member, whereby the door handle is held at the pop-up position. Therefore, a biasing force of the second member biasing member acts as a holding force for holding the door handle at the pop-up position. According to this disclosure, the holding force is defined by the biasing force of the second member biasing force, and is not affected by a contact state between members constituting the door handle device, use environment of the door handle device, and the like. Therefore, the holding force for holding the door handle at the pop-up position can be stabilized (fluctuation can be prevented or avoided).

A configuration can be applied in which

- the second member is supported by the first member to be movable between a first position where the second member is located in a direction in which a biasing force of the second member biasing member is applied and a second position where the second member is located in a direction against the biasing force with respect to the first position, and
- while the first member moves from the pop-up corresponding position to the storage corresponding position, the first member is restricted from moving from the pop-up corresponding position to the storage corresponding position by an end on a movement direction side of the second member located at the second position coming into contact with a predetermined surface of the third member.

When an external force for moving the door handle from the pop-up position to the storage position is applied to the door handle, a force in a direction for moving the first member from the pop-up corresponding position to the storage corresponding position is applied to the first member. At this time, when the third member is located at the in-trajectory position, the second member supported by the first member comes into contact with the third member. The second member is biased by the second member biasing member toward a front side in a movement direction when the first member moves from the pop-up corresponding position to the storage corresponding position with respect to the first member. Therefore, when the second member comes into contact with the third member, the biasing force of the second member biasing member acts in a direction in which the first member is biased from the storage corresponding position toward the pop-up corresponding position. Therefore, since the first member is restricted from moving from the pop-up corresponding position to the storage corresponding position by the biasing force of the second member biasing member, the first member is held at the pop-up corresponding position, and as a result, the door handle is held at the pop-up position.

A configuration can be applied in which

- the predetermined surface of the third member is a flat surface substantially parallel to a movement direction of the third member.

According to such a configuration, a force applied between the second member and the third member does not act in a direction in which the second member moves. Therefore, depending on the force between the second member and the third member, the third member does not move to the out-of-trajectory position, and thus the first member does not move from the pop-up corresponding position to the storage corresponding position. Therefore, the door handle is held at the pop-up position.

A configuration can be applied in which

- the vehicle door handle device further includes: a fourth member movable between an initial position where the third member is held at the out-of-trajectory position and an operation position where the third member is allowed to be located at the in-trajectory position; and
- a third member biasing member configured to bias the third member to the in-trajectory position, in which
- when the fourth member is located at the operation position and the first member is located at the pop-up corresponding position, the third member is held at the in-trajectory position by a biasing force of the third member biasing member.

According to such a configuration, by moving the fourth member from the initial position to the operation position, the first member can move to the pop-up corresponding position, and the third member can move to the in-trajectory position. That is, the door handle can move to the pop-up position by moving the fourth member from the initial position to the operation position, and the door handle can be held at the pop-up position by the biasing force of the second member biasing member.

A configuration can be applied in which the fourth member moves, when moving from the operation position to the initial position, the third member from the in-trajectory position to the out-of-trajectory position when the third member is located at the in-trajectory position and the first member is located at the pop-up corresponding position, and the third member allows the first member to move from the pop-up corresponding position to the storage corresponding position when the third member moves from the in-trajectory position to the out-of-trajectory position by the movement of the fourth member from the operation position to the initial position.

According to such a configuration, by moving the fourth member from the operation position to the initial position, the first member located at the pop-up corresponding position can move to the storage corresponding position. Therefore, by moving the fourth member from the operation position to the initial position, the door handle located at the pop-up position can move to the storage position.

A configuration can be applied in which the fourth member moves, when moving from the initial position to the operation position, the first member from the storage corresponding position to the pop-up corresponding position when the first member is located at the storage corresponding position.

According to such a configuration, by moving the fourth member from the initial position to the operation position, the first member located at the storage corresponding position can move to the pop-up corresponding position. Therefore, by moving the fourth member from the initial position to the operation position, the door handle located at the storage position can move to the pop-up position.

A configuration can be applied in which the vehicle door handle device further includes: a door handle biasing member configured to bias the door handle to the storage position, in which the first member moves, when being located at the pop-up corresponding position, to the storage corresponding position by a biasing force of the door handle biasing member transmitted via the door handle when the fourth member moves from the operation position to the initial position.

According to such a configuration, when the fourth member moves from the operation position to the initial position, the door handle automatically moves from the pop-up position to the storage position by the biasing force of the door handle biasing member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door handle device comprising:

a door handle supported by a housing to be movable between a storage position where the door handle is stored in the housing and a pop-up position where at least a part of the door handle jumps out of the housing;

a first member configured to move in conjunction with the door handle such that the first member is located at a storage corresponding position when the door handle is located at the storage position and is located at a pop-up corresponding position when the door handle is located at the pop-up position;

a second member supported movably with respect to the first member;

a second member biasing member configured to bias the second member to be elastically movable with respect to the first member;

a third member movable between an out-of-trajectory position and an in-trajectory position, the out-of-trajectory position being a position outside a movement trajectory of the second member when the first member moves from the pop-up corresponding position to the storage corresponding position, the in-trajectory position being a position where at least a part of the third member enters the movement trajectory;

a fourth member movable between an initial position where the third member is held at the out-of-trajectory position and an operation position where the third member is allowed to be located at the in-trajectory position; and a third member biasing member configured to bias the third member to the in-trajectory position, wherein when the first member is located at the pop-up corresponding position and the third member is located at the in-trajectory position, the first member is restricted from moving from the pop-up corresponding position to the storage corresponding position by the second member coming into contact with the third member, the second member is supported by the first member to be movable between a first position where the second member is located in a direction in which a biasing force of the second member biasing member is applied and a second position where the second member is located in a direction against the biasing force with respect to the first position, while the first member moves from the pop-up corresponding position to the storage corresponding position, the first member is restricted from moving from the pop-up corresponding position to the storage corresponding position by an end on a movement direction side of the second member located at the second position coming into contact with a predetermined surface of the third member, and when the fourth member is located at the operation position and the first member is located at the pop-up corresponding position, the third member is held at the in-trajectory position by a biasing force of the third member biasing member.

2. The vehicle door handle device according to claim 1, wherein the predetermined surface of the third member is a flat surface substantially parallel to a movement direction of the third member.

3. The vehicle door handle device according to claim 1, wherein the fourth member moves, when moving from the operation position to the initial position, the third member from the in-trajectory position to the out-of-trajectory position when the third member is located at the in-trajectory position and the first member is located at the pop-up corresponding position, and the third member allows the first member to move from the pop-up corresponding position to the storage corresponding position when the third member moves from the in- trajectory position to the out-of-trajectory position by the movement of the fourth member from the operation position to the initial position.

4. The vehicle door handle device according to claim 1, wherein the fourth member moves, when moving from the initial position to the operation position, the first member from the storage corresponding position to the pop-up corresponding position when the first member is located at the storage corresponding position.

5. The vehicle door handle device according to claim 4, further comprising:

a door handle biasing member configured to bias the door handle to the storage position, wherein the first member moves, when being located at the pop-up corresponding position, to the storage corresponding position by a biasing force of the door handle biasing member transmitted via the door handle when the fourth member moves from the operation position to the initial position.

* * * * *